US011540255B2

(12) United States Patent
Shen

(10) Patent No.: US 11,540,255 B2
(45) Date of Patent: *Dec. 27, 2022

(54) RESOURCE CONFIGURATION METHOD AND APPARATUS, AND COMPUTER STORAGE MEDIUM

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 260 days.

This patent is subject to a terminal disclaimer.

(21) Appl. No.: 16/987,964

(22) Filed: Aug. 7, 2020

(65) Prior Publication Data
US 2020/0367229 A1    Nov. 19, 2020

Related U.S. Application Data

(63) Continuation of application No. PCT/CN2018/075864, filed on Feb. 8, 2018.

(51) Int. Cl.
*H04W 4/00* (2018.01)
*H04W 72/04* (2009.01)

(52) U.S. Cl.
CPC .............. *H04W 72/0406* (2013.01)

(58) Field of Classification Search
USPC ....... 370/229, 230, 236, 252, 328, 329, 330, 370/431, 433, 436, 437, 465, 468
See application file for complete search history.

(56) References Cited

U.S. PATENT DOCUMENTS

| 11,064,527 | B2* | 7/2021 | Jiang | H04W 74/0833 |
| 2010/0130137 | A1 | 5/2010 | Pelletier et al. | |
| 2019/0007124 | A1* | 1/2019 | Seo | H04L 5/0053 |
| 2020/0245395 | A1* | 7/2020 | Zhang | H04L 5/0053 |
| 2021/0051630 | A1* | 2/2021 | Chae | H04W 72/0453 |
| 2021/0176757 | A1* | 6/2021 | Hwang | H04W 72/042 |

FOREIGN PATENT DOCUMENTS

| CN | 106455081 A | 2/2017 |
| EP | 3713334 A1 | 9/2020 |

OTHER PUBLICATIONS

3GPP TS 38.213 V15.0.0 (Dec. 2017); 3rd Generation Partnership Project; Technical Specification Group Radio Access Network;NR;Physical layer procedures for control(Release 15).

(Continued)

*Primary Examiner* — Nguyen H Ngo
(74) *Attorney, Agent, or Firm* — Ladas & Parry LLP

(57) ABSTRACT

The present disclosure discloses a resource configuration method, an apparatus, and a computer storage medium, where the method includes: receiving, by a terminal, first control information sent by a network device, where the first control information includes first indication information, where the first indication information is used to determine at least two downlink BWPs and at least two uplink BWPs to be activated, and activating, by the terminal, the at least two downlink BWPs and the at least two uplink BWPs according to the first control information.

14 Claims, 10 Drawing Sheets

A terminal receives first control information sent by a network device, where the first control information includes first indication information, where the first indication information is used to determine at least two downlink bandwidth parts BWPs and at least two uplink BWPs to be activated — 201

The terminal activates the at least two downlink BWPs and the at least two uplink BWPs according to the first control information — 202

(56) References Cited

OTHER PUBLICATIONS

The EESR of corresponding European application No. 18905112.1, dated Dec. 2, 2020.
VIVO: "Other aspects on bandwidth Parts", 3GPP Draft; R1-1719800_BWP_Final, 3rd Generation Partnership Project (3GPP), Mobile Competence Centre; 660, Route Des Lucioles; F-06921 Sophia-Antipolis Cedex; France, vol. RAN WG1, No. Reno, USA; Nov. 27, 2017-Dec. 1, 2017 Nov. 18, 2017(Nov. 18, 2017).
3GPP."Bandwidth Part Configuration and Frequency Resource Allocation" 3GPP TSG RAN WG1 NR Ad-Hoc #2 R1-1710164, Qingdao, P.R. China Jun. 27-30, 2017, Jun. 20, 2017(Jun. 30, 2017).
3GPP."Overall Impact in RAN2 for BWP" 3GPP TSG RAN WG2 Meeting #99 bis R2-1710592, Prague, Czech Republic, Oct. 9-13, 2017, Oct. 13, 2017(Oct. 13, 2017), entire document.
International Search Report(ISR) dated Oct. 25, 2018 for Application No. PCT/CN2018/076864.
The first office action of the parallel EP application No. 18905112.1 dated Jul. 11, 2022.

\* cited by examiner

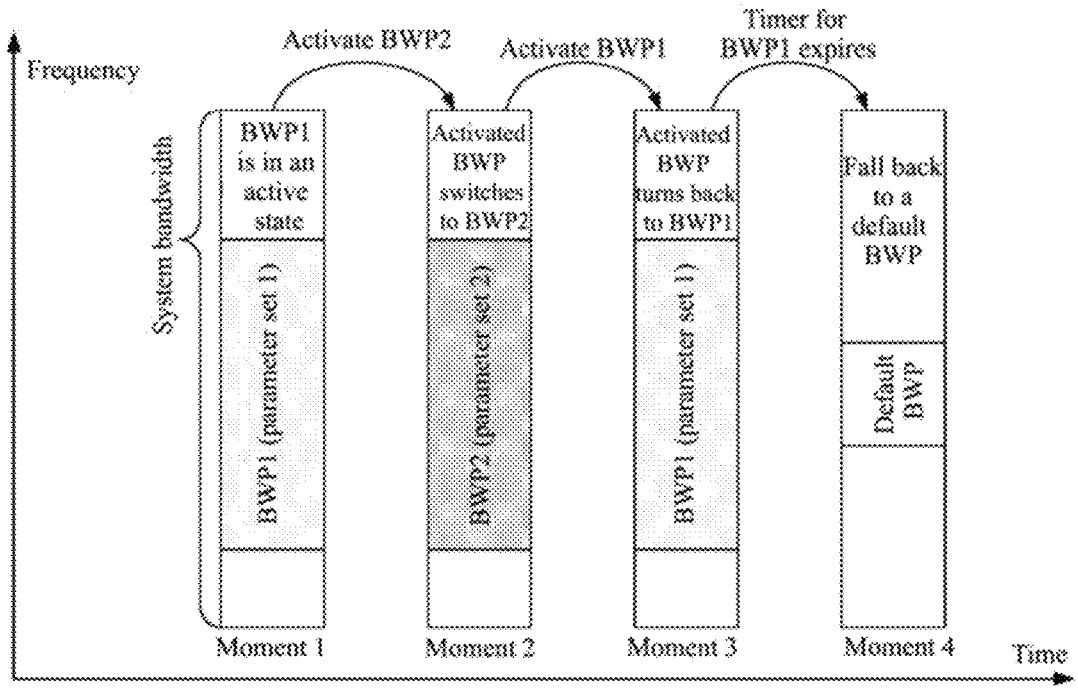

FIG. 1

A terminal receives first control information sent by a network device, where the first control information includes first indication information, where the first indication information is used to determine at least two downlink bandwidth parts BWPs and at least two uplink BWPs to be activated — 201

The terminal activates the at least two downlink BWPs and the at least two uplink BWPs according to the first control information — 202

FIG. 2

A network device sends first control information to a terminal, where the first control information includes first indication information, where the first indication information is used to determine at least two downlink BWPs and at least two uplink BWPs to be activated to cause the terminal to activate the at least two downlink BWPs and the at least two uplink BWPs according to the first control information — 301

FIG. 3

RESOURCE CONFIGURATION METHOD AND APPARATUS, AND COMPUTER STORAGE MEDIUM

CROSS-REFERENCE TO RELATED APPLICATION

This disclosure is a continuation of international Application No. PCT/CN2018/075864, filed on Feb. 8, 2018, the disclosure of which is hereby incorporated by reference in its entirety.

TECHNICAL FIELD

The present disclosure relates to the field of wireless communication technology, and in particular, to a resource configuration method, an apparatus, and a computer storage medium.

BACKGROUND

In a Long Term Evolution (LTE) system, frequency domain resources of a terminal are allocated in an entire system bandwidth. In a $5^{th}$ Generation (5G) New Radio (NR) system, a transmission bandwidth of the terminal may only occupy a part of the system bandwidth because the system bandwidth is greatly improved.

In a current research of the 5G NR, it has been decided to introduce a concept of bandwidth part (BWP) to achieve frequency domain resource allocation in a range smaller than the system bandwidth. A base station can configure multiple BWPs by radio resource control (RRC) signaling, and then dynamically activate a BWP in downlink control information (DCI). Each BWP is based on a parameter set, where the parameter set includes subcarrier spacing and cyclic prefix (CP). According to the current scheme, only one BWP can be activated for a terminal. When a new BWP is activated, the original BWP is deactivated.

As shown in FIG. 1, when BWP1 is in an active state, if BWP2 is activated, BWP1 will be deactivated, and if BWP1 is also deactivated, a default BWP will be fallen back to.

The existing technical solution cannot support simultaneous activation of multiple BWPs, and therefore it can neither support simultaneous use of multiple parameter sets, nor respectively optimize parameter sets of multiple types of services for different services when they are transmitted in parallel. And switching between two parameter sets will also cause switching between two BWPs, thereby causing a RE bandwidth of the terminal to be converted, which, in turn, will cause the terminal to be unable to receive or send data for a period of time, resulting in a waste of spectrum resources.

SUMMARY

To solve the above technical problem, embodiments of the present disclosure provide a resource configuration method, an apparatus, and a computer storage medium.

A resource configuration method provided by an embodiment of the present disclosure includes:

receiving, by a terminal, first control information sent by a network device, where the first control information includes first indication information, where the first indication information is used to determine at least two downlink bandwidth parts BWPs and at least two uplink BWPs to be activated; and activating, by the terminal, the at least two downlink BWPs and the at least two uplink BWPs according to the first control information.

In an embodiment of the present disclosure, the method further includes:

receiving, by the terminal, first configuration information sent by the network device, where the first configuration information includes configuration information of at least one downlink BWP set and at least one uplink BWP set, where each of the at least one downlink BWP set includes multiple downlink BWPs, and each of the at least one uplink BWP set includes multiple uplink BWPs.

In an embodiment of the present disclosure, the activating, the terminal, the at least two downlink BWPs and the at least two uplink BWPs according to the first control information includes:

activating, by the terminal, downlink BWPs in a first downlink BWP set and uplink BWPs in a first uplink BWP set if the first indication information is indication information of the first downlink BWP set or the first uplink BWP set.

In an embodiment of the present disclosure, the method further includes:

receiving, by the terminal, second configuration information sent by the network device, where the second configuration information includes first duration information corresponding to the first downlink BWP set and/or the first uplink BWP set; and deactivating the downlink BWPs in the first downlink BWP set and the uplink BWPs in the first uplink BWP set when an activation duration of the downlink BWPs in the first downlink BWP set and the uplink BWPs in the first uplink BWP set reaches a first duration indicated by the first duration information.

In an embodiment of the present disclosure, the method further includes:

receiving, by the terminal, third configuration information sent by the network device, where the third configuration information includes second duration information corresponding to a first downlink BWP in the first: downlink BWP set and a first uplink BWP in the first uplink BWP set; and deactivating the first downlink BWP and the first uplink BMP when an activation duration of the first downlink BWP and the first uplink BWP reaches a second duration indicated by the second duration information.

In an embodiment of the present disclosure, the method further includes:

activating a default BWP when the downlink BWPs in the first downlink BWP set and the uplink BWPs in the first uplink BWP set are both deactivated.

In an embodiment of the present disclosure, the activating, lay the terminal, the at least two downlink BWPs and the at least two uplink BWPs according to the first control information includes:

activating, by the terminal, downlink BWPs in a second downlink BWP set and uplink BWPs in a second uplink BWP set if it is determined that the downlink BWPs in the second downlink BWP set and the uplink BWPs in the second uplink BWP set meet a predetermined rule based on the first configuration information and the first indication information is indication information of a second downlink BWP in the second downlink BWP set or indication information of a second uplink BWP in the second uplink BWP set.

In an embodiment of the present disclosure, the method further includes:

activating, by the terminal, a second downlink BWP in a second downlink BWP set and a second uplink BWP in a second uplink BWP set if it is determined that downlink BWPs in the second downlink BWP set or uplink BWPs in the second uplink BWP set does not meet a predetermined rule based on the first configuration information and the first indication information is indication information of the second downlink BWP in the second downlink BWP set or indication information of the second uplink BWP in the second uplink BWP set.

In an embodiment of the present disclosure, the downlink BWPs in the second downlink BWP set and the uplink BWPs in the second uplink BWP set meeting a predetermined rude includes:

the downlink BWPs in the second downlink BWP set having the same frequency domain position and bandwidth size, and the uplink BWPs in the second uplink BWP set having the same frequency domain position and bandwidth sizes; or, frequency domain ranges of downlink BWPs other than the second downlink BWP in the second downlink BWP set being within a frequency domain range of the second downlink BWP, and frequency domain ranges of uplink BWPs other than the second uplink BWP in the second uplink BWP set being within a frequency domain range of the second uplink BWR; or, a radio frequency bandwidth capability of the terminal being capable of simultaneously covering frequency domain ranges of the downlink BWPs in the second downlink BWP set and frequency domain ranges of the uplink BWPs in the second uplink BWP set.

In an embodiment of the present disclosure, the method further includes:

receiving, by the terminal, fourth configuration information sent by the network device, where the fourth configuration information includes third duration information corresponding to the second downlink BWP and the second uplink BWP; and deactivating the downlink BWPs in the second downlink BWP set and the uplink BWPs in the second uplink BWP set when an activation duration of the second downlink BWP and the second uplink BWP reaches a third duration indicated by the third duration information.

In an embodiment of the present disclosure, the method further includes:

receiving, by the terminal, fifth configuration information sent by the network device, where the fifth configuration information includes fourth duration information corresponding to a third downlink BWP in the second downlink BWP set and a third uplink BWP in the second uplink BWP set; and deactivating the third downlink BWP and the third uplink BWP when an activation duration of the third downlink BWP and the third uplink BWP reaches a fourth duration indicated by the fourth duration information, where the third downlink BWP is different from the second downlink BWP, and the third uplink BWP is different front the second uplink BWP.

In an embodiment of the present disclosure, the method further includes:

activating a default BWP when the downlink BWPs in the second downlink BWP set and the uplink BWP in the second uplink BWP set are both deactivated.

A resource configuration method provided by an embodiment of the present disclosure includes:

sending, by a network device, first control information to a terminal, where the first control information includes first indication information, where the first indication information is used to determine at least two downlink BWPs and at least two uplink BWPs to be activated to cause the terminal to activate the at least two downlink BWPs and the at least two uplink BWPs according to the first control information.

In an embodiment of the present disclosure, the method further includes:

sending, by the network device, first control information to the terminal, where the first configuration information includes configuration information of at least one downlink BWP set and at least one uplink BWP set, where each of the at least one downlink BWP set includes multiple downlink BWPs, and each of the at least one uplink BWP set includes multiple uplink BWPs.

In an embodiment of the present disclosure, the first indication information is used to cause the terminal to activate downlink BWPs in a first downlink BWP set and uplink BWPs in a first uplink BWP set if the first indication information is indication information of the first downlink BWP set or the first uplink BWP set.

In an embodiment of the present disclosure, the method further includes:

sending, by the network device, second configuration information to the terminal, where the second configuration information includes first duration information corresponding to the first downlink BWP set and/or the first uplink. BWP set;

where the first duration information is used to cause the terminal to deactivate the downlink BWPs in the first downlink BWP set and the uplink BWPs in the first uplink BWP set when an activation duration of the downlink BWPs in the first downlink BWP set and the uplink BWPs in the first uplink BWP set reaches a first duration indicated by the first duration information.

In an embodiment of the present disclosure, the method further includes:

sending, by the network device, third configuration information to the terminal, where the third configuration information includes second duration information corresponding to a first downlink BWP in the first downlink BWP set and a Int uplink BWP in the first uplink BWP set;

where the second duration information is used to cause the terminal to deactivate the first downlink BWP and the first uplink BWP when an activation duration of the first downlink BWP and the first uplink BWP reaches a second duration indicated by the second duration information.

In an embodiment of the present disclosure, the first indication information is used to cause the terminal to activate downlink BWPs in a second downlink BWP set and uplink BWPs in a second uplink BWP set if it is determined that the downlink BWPs in the second downlink BWP set and the uplink BWPs in the second uplink BWP set meet a predetermined rule based on the first configuration information and the first indication information is indication information of a second downlink BWP in the second downlink BWP set or indication information of a second uplink BWP in the second uplink BWP set.

In an embodiment of the present disclosure, the first indication information is used to cause the terminal to activate a second downlink BWP in a second downlink BWP set and a second uplink BWP in a second uplink BWP set if, it is determined that downlink BWPs the second downlink BWP set or uplink BWPs in the second uplink BWP set does not meet a predetermined rule based on the first configuration information and the first indication information is indication information of the second downlink BWP in the second downlink BWP set or indication information of the second uplink BWP in the second uplink BWP set.

In an embodiment of the present disclosure, the downlink BWPs in the second downlink BWP set and the uplink BWPs in the second uplink BWP set meeting a predetermined rule, includes:

the downlink BWPs in the second downlink BWP set having the same frequency domain position and bandwidth size, and the uplink BWPs in the second uplink BWP set having the same frequency domain position and bandwidth sizes; or, frequency domain ranges of downlink BWPs other than the second downlink BWP in the second downlink BWP set being within a frequency domain range of the second downlink BWP, and frequency domain ranges of uplink BWPs other than the second uplink BWP in the second uplink BWP set being within a frequency domain range of the second uplink BWP; or, a radio frequency bandwidth capability of the terminal being capable of simultaneously covering frequency domain ranges of the downlink BWPs in the second downlink BWP set and frequency domain ranges of the uplink BWPs in the second uplink BWP set.

In an embodiment of the present disclosure, the method further includes:

sending, by the network device, fourth configuration information to the terminal, where the fourth configuration information includes third duration information corresponding to the second downlink BWP and the second uplink BWP;

where the third duration information is used to cause the terminal to deactivate the downlink BWPs in the second downlink BWP set and the uplink BWPs in the second uplink BWP set when an activation duration of the second downlink BWP and the second uplink BWP reaches a third duration indicated by the third duration information.

In an embodiment of the present disclosure, the method further includes:

sending, by the network device, fifth configuration information to the terminal, where the fifth configuration information includes fourth duration information corresponding to a third downlink BWP in the second downlink BWP set and a third uplink BWP in the second uplink BWP set;

where the fourth duration information is used to cause the terminal to deactivate the third downlink. BWP and the third uplink BWP when an activation duration of the third downlink BWP and the third uplink BWP reaches a fourth duration indicated by the fourth duration information, where the third downlink BWP as different from the second downlink BWP, and the third uplink BWP is different from the second uplink BWP.

A resource configuration apparatus provided by an embodiment of the present disclosure includes:

a first receiving unit, configured to receive first control information sent by a network device, where the first control information includes first indication information, where the first indication information is used to determine at least two downlink bandwidth parts BWPs and at least two uplink BWPs to be activated; and an activating unit, configured to activate the at least two downlink BWPs and the at least two uplink BWPs according to the first control information.

In an embodiment of the present disclosure, the apparatus further includes:

a second receiving unit, configured to receive first configuration information sent by the network device, where the first configuration information includes configuration information of at least one downlink BWP set and at least one uplink BWP set, where each of the at least one downlink BWP set includes multiple downlink BWPs, and each of the at least one uplink BWP set includes multiple uplink BWPs.

In an embodiment of the present disclosure, the activating unit is configured to activate downlink BWPs in a first downlink BWP set and uplink BWPs in a first uplink BWP set if the first indication information is indication information of the first downlink BWP set or the first uplink BWP set.

In an embodiment of the present disclosure, the apparatus further includes:

an third receiving unit, configured to receive second configuration information sent by the network device, where the second configuration information includes first duration information corresponding to the first downlink BWP set sand or the first uplink BWP set; and a deactivating unit, configured to deactivate the downlink BWPs in the first downlink BWP set and the uplink BWPs in the first uplink BWP set when an activation duration of the downlink BWPs in the first downlink BWP set and the uplink BWPs in the first uplink BWP set reaches a first duration indicated by the first duration information.

In an embodiment of the present disclosure, the apparatus further includes:

a fourth receiving unit, configured to receive third configuration information sent by the network device, where the third configuration information includes second duration information corresponding to a first downlink BWP in the first downlink BWP set and a first uplink BWP in the first uplink BWP set; and a deactivating unit, configured to deactivate the first downlink BWP and the first uplink BWP when an activation duration of the first downlink BWP and the first uplink BWP reaches a second duration indicated by the second duration information.

In an embodiment of the present disclosure, the activating unit is further configured to activate a default BWP when the downlink BWPs in the first downlink BWP set and the uplink BWPs in the first uplink BWP set are both deactivated.

In an embodiment of the present disclosure, the activating unit is configured to activate downlink BWPs in a second downlink BWP set and uplink BWPs in a second uplink BWP set if it is determined that the downlink BWPs in the second downlink BWP set and the uplink BWPs in the second uplink BWP set meet a predetermined rule based on the first configuration information and the first indication information is indication information of a second downlink BWP in the second downlink BWP set or indication information of a second uplink BWP in the second uplink BWP set.

In an embodiment of the present disclosure, the activating unit is configured to activate a second downlink BWP in a second downlink BWP set and a second uplink BWP a second uplink BWP set if it is determined that downlink BWPs in the second downlink BWP set or uplink BWPs in the second uplink BWP set does not meet a predetermined rule based on the first configuration information and the first indication information is indication information of the second downlink BWP in the second downlink BWP set or indication information of the second uplink BWP in the second uplink BWP set.

In an embodiment of the present disclosure, the downlink BWPs in the second downlink BWP set and the uplink BWPs in the second uplink BWP set meeting a predetermined rule, includes;

the downlink BWPs in the second downlink BWP set having the same frequency domain position and bandwidth size, and the uplink BWPs in the second uplink BWP set having the same frequency domain position and bandwidth sizes; or, frequency domain ranges of downlink BWPs other than the second downlink BWP in the second downlink BWP set being within a frequency domain range of the second downlink BWP, and frequency domain ranges of uplink BWPs other than the second uplink BWP in the second uplink BWP set being within a frequency domain range of the second uplink BWP; or, a radio frequency bandwidth capability of the terminal being capable of simultaneously covering frequency domain ranges of the downlink BWPs in the second downlink BWP set and frequency domain ranges of the uplink BWPs in the second uplink BWP set.

In an embodiment of the present disclosure, the apparatus further includes:

a fifth receiving unit, configured to receive fourth configuration information sent by the network device, where the fourth configuration information includes third duration information corresponding to the second downlink BWP and the second uplink BWP; and a deactivating unit, configured to deactivate the downlink BWPs in the second downlink BWP set and the uplink BWPs in the second uplink BWP set when an activation duration of the second downlink BWP and the second uplink BWP reaches a third duration indicated by the third duration information.

In an embodiment of the present disclosure, the apparatus further includes:

a sixth receiving unit, configured to receive fifth configuration information sent by the network device, where the fifth configuration information includes fourth duration information corresponding to a third downlink BWP in the second downlink BWP set and a third uplink BWP in the second uplink BWP set; and a deactivating unit, configured to deactivate the third downlink BWP and the third uplink BWP when an activation duration of the third downlink BWP and the third uplink BWP reaches a fourth duration indicated by the fourth duration information, where the third downlink BWP is different from the second downlink BWP, and the third uplink BWP is different from the second uplink BWP.

In an embodiment of the present disclosure, the activating unit is further configured to activate a default BWP when the downlink BWPs in the second downlink BWP set and the uplink BWP in the second uplink BWP set are both deactivated.

A resource configuration apparatus provided by an embodiment of the present disclosure includes:

a first sending unit, configured to send first control information to a terminal, where the first control information includes first indication information, where the first indication information is used to determine at least two downlink BWPs and at least two uplink BWPs to be activated to cause the terminal to activate the at least two downlink BWPs and the at least two uplink BWPs according to the first control information.

In an embodiment of the present disclosure, the apparatus further includes:

a second sending unit, configured to send first control information to the terminal, where the first configuration information includes configuration information of at least one downlink BWP set and at least one uplink BWP set, where each of the at least one downlink BWP set includes multiple downlink BWPs, and each of the at least one uplink BWP set includes multiple uplink BWPs.

In an embodiment of the present disclosure, the first indication information is used to cause the terminal to activate downlink BWPs in a first downlink BWP set and uplink BWPs in a first uplink BWP set if the first indication information is indication information of the first downlink BWP set or the first uplink BWP set.

In an embodiment of the present disclosure, the apparatus further includes:

a third sending unit configured to send second configuration information to the terminal, where the second configuration information includes first duration information corresponding to the first downlink BWP set and/or the first uplink BWP set;

where the first duration information is used to cause the terminal to deactivate the downlink BWPs in the first downlink BWP set and the uplink BWPs in the first uplink BWP set when an activation duration of the downlink BWPs in the first downlink BWP set and the uplink BWPs in the first uplink BWP set reaches a first duration indicated by the first duration information.

In an embodiment of the present disclosure, the apparatus further includes:

a fourth sending unit, configured to send third configuration information to the terminal, where the third configuration information includes second duration information corresponding to a first downlink BWP in the first downlink BWP set and a first uplink BWP in the first uplink BWP set;

where the second duration information is, used to cause the terminal to deactivate the first downlink BWP and the first uplink BWP when an activation duration of the first downlink BWP and the first uplink BWP reaches a second duration indicated by the second duration information.

In an embodiment of the present disclosure, the first indication information is used to cause the terminal to activate downlink BWPs in a second downlink BWP set and uplink BWPs in a second uplink BWP set if it is determined that the downlink BWPs in the second downlink BWP set and the uplink BWPs in the second uplink BWP set meet a predetermined rule based on the first configuration information and the first indication information is indication information of a second downlink BWP in the second downlink BWP set or indication information of a second uplink BWP in the second uplink BWP set.

In an embodiment of the present disclosure, the first indication information is used to cause the terminal to activate a second downlink BWP in a second downlink BWP set and a second uplink BWP in a second uplink BWP set if it is determined that downlink BWPs in the second downlink BWP set or uplink BWPF, in the second uplink BWP set does not meet a predetermined rule based on the first configuration information and the first indication information is indication information of the second downlink BWP in the second downlink BWP set or indication information of the second uplink BWP in the second uplink BWP set.

In an embodiment of the present disclosure, the downlink BWPs in the second downlink BWP set and the uplink BWPs in the second uplink BWP set meeting a predetermined rule, includes:

the downlink BWPs in the second downlink BWP set having the same frequency domain position and bandwidth size, and the uplink BWPs in the second uplink BWP set having the same frequency domain position and bandwidth sizes; or, frequency domain ranges of downlink BWPs other than the second downlink BWP in the second downlink BWP set being within a frequency domain range of the second downlink BWP, and frequency domain ranges of uplink BWPs other than the second uplink BWP in the second uplink BWP set being within a frequency domain range of the second uplink BWP; or, a radio frequency bandwidth capability of the terminal being capable of simultaneously covering frequency domain ranges of the downlink BWPs in the second downlink BWP set and frequency domain ranges of the uplink BWPs in the second uplink BWP set.

In an embodiment of the present disclosure, the apparatus further includes:

a fifth sending unit, configured to send fourth configuration information to the terminal, Where the fourth configuration information includes third duration information corresponding to the second downlink BWP and the second uplink BWP;

where the third duration information is used to cause the terminal to deactivate the downlink BWPs in the second downlink BWP set and the uplink BWPs in the second uplink BWP set when an activation duration of the second downlink BWP and the second uplink BWP reaches a third duration indicated by the third duration information.

In an embodiment of the present disclosure, the apparatus further includes:

a sixth sending unit, configured to send fifth configuration information to the terminal, where the fifth configuration information includes fourth duration information corresponding to a third downlink BWP in the second downlink BWP set and a third uplink BWP in the second uplink BWP set;

where the fourth duration information is used to cause the terminal to deactivate the third downlink BWP and the third uplink BWP when an activation duration of the third downlink BWP and the third uplink BWP reaches a fourth duration indicated by the fourth duration information, where the third downlink BWP is different from the second downlink BWP, and the third uplink BWP is different from the second uplink BWP.

A computer storage medium provided by an embodiment of the present disclosure has computer executable instructions stored thereon, where the computer-executable instructions, when executed by a processor, implement the above resource configuration methods.

In the technical solutions of the embodiments of the present disclosure, a terminal receives first control information sent by a network device, where the first control information includes first indication information, where the first indication information is used to determine at least two downlink BWPs and at least two uplink BWPs to be activated, and the terminal activates the at least two downlink BWPs and the at least two uplink BWPs according to the first control information. By using the technical solutions of the embodiments of the present disclosure, a concept of bandwidth part set (BWP set) is introduced. By configuring a BWP set, multiple bandwidth part pairs (BWP pairs) can be simultaneously activated. Transmission of a signal using multiple activated BWP pairs (one BWP pair includes one uplink BWP and one downlink BWP) can flexibly support the simultaneous transmission of multiple types of services, thereby improving scheduling flexibility and spectrum utilization of a system.

BRIEF DESCRIPTION OF DRAWINGS

The drawings described herein are used to provide a further understanding of the present disclosure and thrill a part of the present application. Schematic embodiments of the present disclosure and their descriptions are used to explain the present disclosure, but do not constitute an undue limitation on the present disclosure. In the drawings:

FIG. 1 is a schematic diagram in which only one BWP can be in an active stale;

FIG. 2 is a first schematic flowchart of a resource configuration method according to an embodiment of the present disclosure;

FIG. 3 is a second schematic flowchart two of a resource configuration method according to an embodiment of the present disclosure;

DESCRIPTION OF EMBODIMENTS

Figure 4:
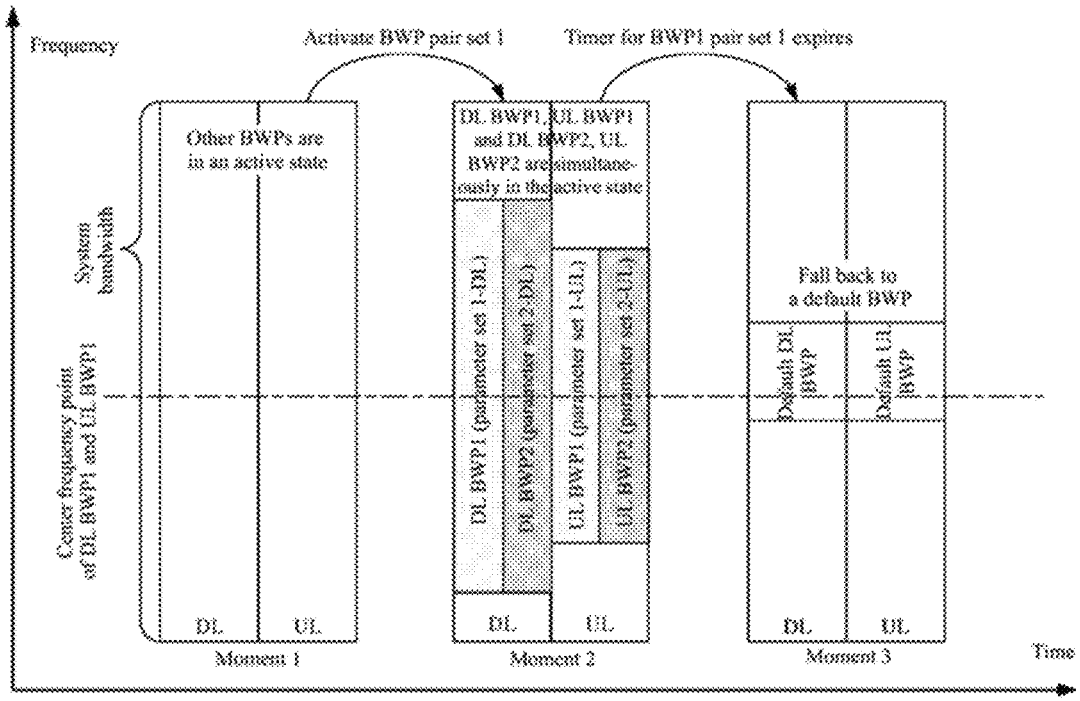
FIG. 4 is a schematic diagram according to an embodiment of the present disclosure in which BWPs in a BWP pair set are simultaneously deactivated.

In order to understand the features and technical contents of the embodiments of the present disclosure in more detail, the following describes the implementation of the embodiments of the present disclosure in detail with reference to the drawings. The accompanying drawings are for reference only and are not intended to limit the embodiments of the present disclosure.

FIG. 2 is a first schematic flowchart of a resource configuration method according to an embodiment of the present disclosure. As shown in FIG. 2, the resource configuration method includes the following steps:

Step 201: by a terminal receives first control information sent by a network device, where the first control information includes first indication information, where the first indication information is used to determine at least two downlink BWPs and at least two uplink BWPs to be activated.

In the embodiment of the present disclosure, the terminal may be any device that can communicate with a network, such as a mobile phone, a tablet computer, a notebook computer, or a desktop computer.

In the embodiment of the present disclosure, the network device may be a base station, such as a gNB of a 5G system.

In the embodiment of the present disclosure, the first control information is DCI or Media Access Control Control Element (MAC CE).

Step 202: the terminal activates the at least two downlink BWPs and at least two uplink BWPs according to the first control information.

In the embodiment of the present disclosure, the terminal receives first configuration information sent by the network device, where the first configuration information includes configuration information of at least one downlink BWP set and at least one uplink BWP set, where each of the at least one downlink BWP set includes multiple downlink BWPs, and each of the at least one uplink BWP set includes multiple uplink BWPs.

Here, configuration information of a BWP set includes a BWP ID, a frequency domain position, a bandwidth size, and a parameter set of a BWP in the BWP set, where the parameter set includes subcarrier spacing and CP.

It is worth noting that: a downlink BWP and an uplink BWP appear in pairs in the embodiment of the present disclosure. For example, a downlink BWP1 and an uplink BWP1 need to be activated or deactivated together.

In the embodiment of the present disclosure, the first configuration information is at RRC signaling or system information (SI).

In the embodiment of the present disclosure, the terminal activating the at least two downlink BWPs and the at least two uplink BWPs according to the first control information may be implemented in the following schemes:

Scheme one: the terminal activates downlink BWPs in a first downlink BWP set and uplink BWPs in a first uplink BWP set if the first indication information is indication information of the first downlink BWP set or the first uplink BWP set.

For example: the first configuration information includes configuration information for a first downlink DL BWP set and an uplink first UL BWP set. The first DL BWP set includes $DL\_BWP_1, \ldots, DL\_BWP_N$ (N ≥ 2), and the first UL BWP set includes $UL\_BWP_1, \ldots, UL\_BWP_N$ (N ≥ 2). After receiving the first control information including the indication information of the first DL BWP set or the second UL BWP set, the terminal activates $DL\_BWP_1, \ldots, DL\_BWP_N$ and $UL\_BWP_1, \ldots, UL\_BWP_N$, $DL\_BWP_1, \ldots, DL\_BWP_N$ become downlink activated BWPs, and $UL\_BWP_1, \ldots, UL\_BWP_N$ become uplink activated BWPs.

In an implementation, the method further includes: the terminal receives second configuration information sent by the network device, where the second configuration information includes first duration information corresponding to the first downlink BWP set and/or the first uplink BWP set; and deactivates the downlink BWPs in the first downlink. BWP set and the uplink BWPs in the first uplink BWP set when an activation duration of the downlink BWPs in the first downlink BWP set and the uplink BWPs in the first uplink BWP set reaches a first duration indicated by the first duration information.

For example, the terminal receives the second configuration information from the network device, and the second configuration information is configured to include information about a timer (set_timer) for the first DL BWP set and/or the first UL BWP set. When the set_timer expires, the $DL\_BWP_1, \ldots, DL\_BWP_N$ and $UL\_BWP_1, \ldots, UL\_BWP_N$ are deactivated.

In an implementation, the method further includes: the terminal receives third configuration information sent by the network device, where the third configuration information includes second duration information corresponding to a first downlink BWP in the first downlink BWP set and a first uplink BWP in the first uplink BWP set; and deactivates the first downlink BWP and the first uplink BWP when an activation duration of the first downlink BWP and the first uplink BWP reaches a second duration indicated by the second duration information.

For example, the terminal receives the third configuration information from the network device, and the third configuration information is configured to include a timer ($timer_i$) for $DL\ BWP_i$ and $UL\ BWP_i$ (i=1, ..., N), and when the timer expires, $DL\ BWP_i$ and $UL\ BWP_i$ are deactivated.

In an implementation, the method further includes: activate a default BWP when the downlink BWPs in the first downlink BWP set and the uplink BWPs in the first uplink BWP set are both deactivated.

For example: when $DL\_BWP_1, \ldots, DL\_BWP_N$ and $UL\_BWP_1, \ldots, UL\_BWP_N$ are deactivated, the downlink activated BWPs and uplink activated BWPs change to the default BWP.

Scheme two: the terminal activates downlink BWPs in a second downlink BWP set and uplink BWPs in a second uplink BWP set if it is determined that the downlink BWPs in the second downlink BWP set and the uplink BWPs in the second uplink BWP set meet a predetermined rule based on the first configuration information and the first indication information is indication information of a second downlink BWP in the second downlink BWP set or indication information of a second uplink BWP in the second uplink BWP set.

For example: the first configuration information includes configuration information for a second downlink DL BWP set and an uplink second UL BWP set. The second DL BWP set includes $DL\_BWP_1, \ldots, DL\_BWP_N$ (N ≥ 2), and the second UL BWP set includes $UL\_BWP_1, \ldots, UL\_BWP_N$ (N ≥ 2). If $DL\_BWP_1, \ldots, DL\_BWP_N$ (N ≥ 2) in the second DL BWP set and $UL\_BWP_1, \ldots, UL\_BWP_N$ (N ≥ 2) in the second UL BWP set meet the predetermined rule, after receiving the first control information including indication information of $DL\_BWP1$ and/or $UL\_BWP_1$, the terminal actives $DL\_BWP_1, \ldots, DL\_BWP_N$ and $UL\_BWP_1, \ldots, UL\_BWP_N$, where the $DL\_BWP_1, \ldots, DL\_BWP_N$ become downlink activated BWPs, and $UL\_BWP_1, \ldots, UL\_BWP_N$ become upstream activated BWPs.

In an implementation, the method further includes: the terminal activates a second downlink BWP in a second downlink BWP set and a second uplink BWP in a second uplink BWP set if it is determined that downlink BWPs in the second downlink BWP set or uplink BWPs in the second uplink BWP set does not meet a predetermined rule based on the first configuration information and the first indication information is indication information of the second downlink BWP in the second downlink BWP set or indication information of the second uplink BWP in the second uplink BWP set.

For example: if none of DL_BWP$_1$, ..., DL_BWP$_N$ (N ≥ 2) meets the predetermined rule or none of UL_BWP$_1$, ..., UL_BWP$_N$ (N ≥ 2) meets the predetermined rule in the configured second downlink BWP set and second uplink BWP set, after the terminal receives the first control information including indication information of DL_BWP$_1$ or UL_BWP$_1$, DL_BWP$_1$ becomes a downlink activated BWP, and UL_BWP$_1$ becomes an uplink activated BWP.

In the embodiment of the present disclosure, the downlink BWPs in the second downlink BWP set and the uplink BWPs in the second uplink BWP set meeting the predetermined raffle, includes at least one of the following.

i) The downlink BWPs in the second downlink BWP set have the same frequency domain position and bandwidth size, and the uplink BWPs in the second uplink BWP set have the same frequency domain position and bandwidth size.

For example, DL_BWP$_1$, ..., DL_BWP$_N$ have the same frequency domain position and bandwidth size and UL_BWP$_1$, ..., UL_BWP$_N$ have the same frequency domain position and bandwidth size.

ii) frequency domain ranges of downlink BWPs other than the second downlink BWP in the second downlink BWP set are within a frequency domain range of the second downlink BWP, and frequency domain ranges of uplink BWPs other than the second uplink BWP in the second uplink BWP set are within a frequency domain range of the second uplink BWP.

For example, frequency domain ranges of DL BWP$_2$, ..., DL BWP$_N$ are within a frequency domain range of DL BWP$_1$, and frequency domain ranges of UL BWP$_2$, ..., UL BWP$_N$ are within a frequency domain range of UL BWP$_1$.

iii) A radio frequency bandwidth capability of the terminal is capable of simultaneously covering frequency domain ranges of the downlink BWPs in the second downlink BWP set and frequency domain ranges of the uplink BWPs in the second uplink BWP set.

For example, the radio frequency bandwidth capability of the terminal is capable of simultaneously covering frequency domain ranges of DL_BWP$_1$, ..., DL_BWP$_N$ and frequency domain ranges of UL_BPW$_1$, ..., UL_BWP$_N$.

In an implementation, the method further includes: the terminal receives fourth configuration information sent by the network device, where the fourth configuration information includes third duration information corresponding to the second downlink BWP and the second uplink BWP; and deactivates the downlink BWPs in the second downlink BWP set and the uplink BWPs in the second uplink BWP set when an activation duration of the second downlink BWP and the second uplink BWP reaches a third duration indicated by the third duration information.

For example, when a timer (timer$_1$) for DL_BWP$_1$ and UL BWP$_1$ expires, DL_BWP$_1$, ..., DL_BWP$_N$ and UL_BWP$_1$, ..., UL_BWP$_N$ are deactivated.

In an implementation, the method further includes: the terminal receives fifth configuration information sent by the network device, where the fifth configuration information includes fourth duration information corresponding to a third downlink BWP in the second downlink BWP set and a third uplink BWP in the second uplink BWP set; and deactivates the third downlink BWP and the third uplink BWP when an activation duration of the third downlink BWP and the third uplink. BWP reaches a fourth duration indicated by the fourth duration information, where the third downlink BWP is different from the second downlink BWP, and the third uplink BWP is different from the second uplink BWP.

For example, when the timer (timer$_i$) for DL BWP$_i$ and UL BWP$_i$ (i=2, ..., N) expires, DL BWP$_i$ and UL BWP$_i$ are deactivated.

In the embodiment of the present disclosure, the method further includes, activate a default BWP when the downlink BWPs in the second downlink BWP set and the uplink BWP in the second uplink BWP set are both deactivated.

For example, when DL_BWP$_1$, ..., DL_BWP$_N$ and UL_BWP$_1$, ..., UL_BWP$_N$ are all deactivated, the downlink activated BWPs and uplink activated BWPs change to the default BWP.

FIG. 3 is a second schematic flowchart of a resource configuration method according to an embodiment of the present disclosure. As shown in FIG. 3, the resource configuration method includes the following steps:

Step 301: a network device sends first control information to a terminal, where the first control information includes first indication information, where the first indication information is used to determine at least two downlink BWPs and at least two uplink BWPs to be activated to cause the terminal to activate the at least two downlink BWPs and the at least two uplink BWPs according to the first control information.

In an implementation, the method further includes: the network device sends first control information to the terminal, where the first configuration information includes configuration information of at least one downlink BWP set and at least one uplink BWP set, where each of the at least one downlink BWP set includes multiple downlink BWPs, and each of the at least one uplink BWP set includes multiple uplink BWPs.

In the embodiment of the present disclosure, the first indication information being used to determine at least two downlink BWPs and at least two uplink BWPs to be activated can be implemented in the following schemes.

Scheme one: the first indication information is used, to cause the terminal to activate downlink BWPs in a first downlink BWP set and uplink BWPs in a first uplink BWP set if the first indication information is indication information of the first downlink BWP set or the first uplink BWP set.

In an implementation, the method further includes: the network device sends second configuration information to the terminal, where the second configuration information includes first duration information corresponding to the first downlink BWP set and/or the first uplink BWP set; where the first duration information is used to cause the terminal to deactivate the downlink BWPs in the first downlink BWP set and the uplink BWPs in the first uplink BWP set when an activation duration of the downlink BWPs in the first downlink BWP set and the uplink BWPs in the first uplink BWP set reaches a first duration indicated by the first duration information.

In an implementation, the method further includes: the network device sends third configuration information to the terminal, where the third configuration information includes second duration information corresponding to a first downlink BWP in the first downlink BWP set and a first uplink BWP in the first uplink BWP set; where the second duration information is used to cause the terminal to deactivate the first downlink BWP and the first uplink BWP when an activation duration of the first downlink BWP and the first uplink BWP reaches a second duration indicated by the second duration information.

Scheme two: the first indication information is used to cause the terminal to activate downlink BWPs in a second downlink BWP set and uplink BWPs in a second uplink BWP set if it is determined that the downlink BWPs in the second downlink BWP set and the uplink BWPs in the second uplink BWP set meet a predetermined rule based on the first configuration information and the first indication information is indication information of a second downlink BWP in the second downlink BWP set or indication information of a second uplink BWP in the second uplink BWP set.

In an implementation, the first indication information is used to cause the terminal to activate a second downlink BWP in a second downlink BWP set and a second uplink BWP in a second uplink BWP set if it is determined that downlink BM's in the second downlink BWP set or uplink BWPs in the second uplink BWP set does not meet a predetermined rule based on the first configuration information and the first indication information is indication information of the second downlink BWP in the second downlink BWP set or indication information of the second uplink BWP in the second uplink BWP set.

In an implementation, the downlink BWPs in the second downlink BWP set and the uplink BWPs the second uplink BWP set meeting a predetermined rule, includes:

the downlink BWPs in the second downlink BWP set having the same frequency domain position and bandwidth size, and the uplink BWPs in the second uplink BWP set having the same frequency domain position and bandwidth sizes; or, frequency domain ranges of downlink BWPs other than the second downlink BWP in the second downlink BWP set being within a frequency domain range of the second downlink BWP, and frequency domain ranges of uplink BWPs other than the second uplink BWP in the second uplink BWP set being within a frequency domain range of the second uplink BWP; or, a radio frequency bandwidth capability of the terminal being capable of simultaneously covering frequency domain ranges of the downlink BWPs in the second downlink BWP set and frequency domain ranges of the uplink BWPs in the second uplink BWP set.

In an implementation, the method further includes: the network device sends fourth configuration information to the terminal, where the fourth configuration information includes third duration information corresponding to the second downlink BWP and the second uplink BWP; where the third duration information is used to cause the terminal to deactivate the downlink BWPs in the second downlink BWP set and the uplink BWPs in the second uplink BWP set when an activation duration of the second downlink BWP and the second uplink BWP reaches a third duration indicated by the third duration information.

In an implementation, the method further includes: the network device sends fifth configuration information to the terminal, where the fifth configuration information includes fourth duration information corresponding to a third downlink BWP in the second downlink BWP set and a third uplink BWP in the second uplink BWP set, where the fourth duration information is used to cause the terminal to deactivate the third downlink BWP and the third uplink BWP when an activation duration of the third downlink BWP and the third uplink BWP reaches a fourth duration indicated by the fourth duration information, where the third downlink BWP is different from the second downlink BWP, and the third uplink BWP different from the second uplink BWP.

The technical solutions of the embodiments of the present disclosure will be further described below in conjunction with specific application examples.

EXAMPLE 1

Configuration and Activation of a BWP Pair Set

As shown in Table 1 and Table 2, the first configuration information configures 4 downlink BWPs and 4 uplink BWPs, and configures which BWP pairs being included in 2 BWP pair sets, where BWP pair set 1 includes DL BWP1, UL BWP1 and DL BWP2, and UL BWP2, and BWP pair set 2 includes DL BWP3, UL BWP3, DL BWP4, UL BWP4, if an ID of BWP pair set 1 is included in the first control information, then DL BWP1, UL BWP1 and DL BWP2, UL BWP2 are simultaneously activated, and if an ID of BWP pair set 2 is included in the first control information, then DL BWP3, BWP3 and DL BWP4, UL BWP4 are simultaneously activated.

TABLE 1 configuration of BWP

| BWP ID | Frequency domain position | Bandwidth size | Parameter set |
|---|---|---|---|
| DL BWP 1 | Frequency domain position 1 | Bandwidth size 1 | Parameter set 1 |
| DL BWP 2 | Frequency domain position 2 | Bandwidth size 2 | Parameter set 2 |
| DL BWP 3 | Frequency domain position 3 | Bandwidth size 3 | Parameter set 3 |
| DL BWP 4 | Frequency domain position 4 | Bandwidth size 4 | Parameter set 4 |
| UL BWP 1 | Frequency domain position 1 | Bandwidth size 5 | Parameter set 1 |
| UL BWP 2 | Frequency domain position 2 | Bandwidth size 6 | Parameter set 2 |
| UL BWP 3 | Frequency domain position 3 | Bandwidth size 7 | Parameter set 3 |
| UL BWP 4 | Frequency domain position 4 | Bandwidth size 8 | Parameter set 4 |

TABLE 2 configuration of BWP pair set

| BWP pair set ID | BWP included |
|---|---|
| BWP pair set 1 | DL BWP 1, UL BWP1 and DL BWP2, UL BWP2 |
| BWP pair set 2 | DL BWP 3, UL BWP3 and DL BWP4, UL BWP4 |

Another method to achieve the same effect is shown in Table 3, that is, two downlink BWP sets are configured, and BWPs included in each BWP set are configured.

TABLE 3

Downlink BWP set and its configuration of downlink BWP

| BWP pair set ID | DL BWP ID | Frequency domain position | Bandwidth size | Parameter set |
|---|---|---|---|---|
| BWP pair set 1 | DL BWP 1 | Frequency domain position 1 | Bandwidth size 1 | Parameter set 1 |
|  | DL BWP 2 | Frequency domain position 2 | Bandwidth size 2 | Parameter set 2 |

TABLE 3-continued

Downlink BWP set and its configuration of downlink BWP

| BWP pair set ID | DL BWP ID | Frequency domain position | Bandwidth size | Parameter set |
|---|---|---|---|---|
| | UL BWP 1 | Frequency domain position 1 | Bandwidth size 5 | Parameter set 1 |
| | UL BWP 2 | Frequency domain position 2 | Bandwidth size 6 | Parameter set 2 |
| BWP pair set 2 | DL BWP 3 | Frequency domain position 3 | Bandwidth size 3 | Parameter set 3 |
| | DL BWP 4 | Frequency domain position 4 | Bandwidth size 4 | Parameter set 4 |
| | UL BWP 3 | Frequency domain position 3 | Bandwidth size 7 | Parameter set 3 |
| | UL BWP 4 | Frequency domain position 4 | Bandwidth size 8 | Parameter set 4 |

EXAMPLE 2

BWPs in a BWP Set are Simultaneously Deactivated

As shown in FIG. 4, when DL BWP1, UL BWP1 and DL BWP2, UL BWP2 belonging to BWP pair set 1 are in an active state, and when a timer for BWP pair set 1 expires, DL BWP1, UL BWP1 and DL BWP2, UL BWP2 are simultaneously deactivated.

EXAMPLE 3

The BWPs in BWP Pair Set are Separately Deactivated

Figure 5:
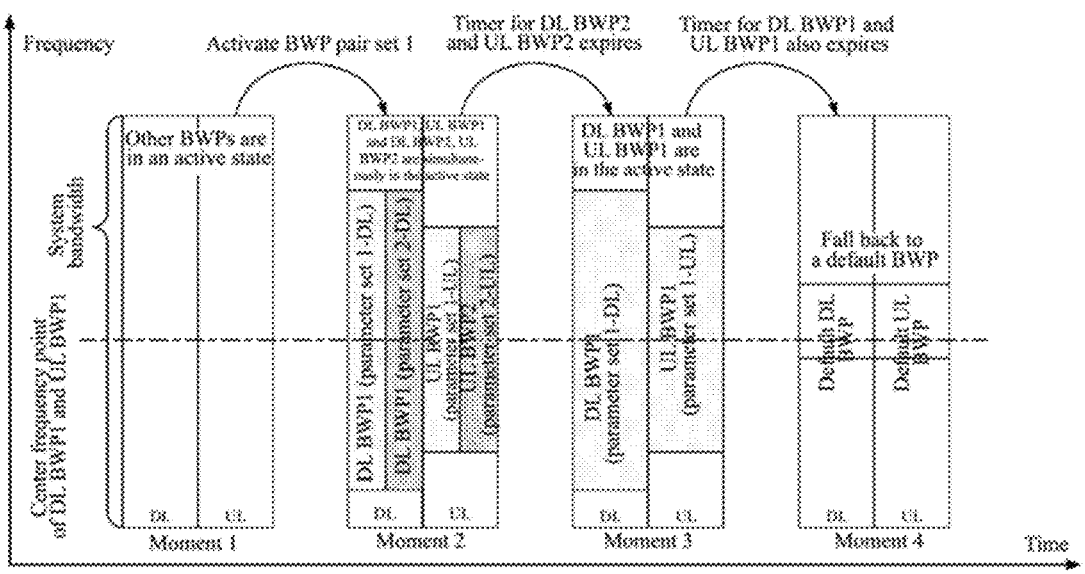
FIG. 5 is a schematic diagram according to an embodiment of the present disclosure in which BWPs in a BWP pair set are separately deactivated.

As shown in FIG. 5, when DL BWP1, UL BWP1 and DL BWP2, UL BWP2 belonging to BWP pair set 1 are in an active state, and when a timer, for DL BWP2 and UL BWP2 expires, DL BWP2 and UL BWP2 are deactivated; when the timer1 for DL BWP1 and UL BWP1 expires, DL BWP1 and UL BWP1 are also deactivated.

EXAMPLE 4

Configuration and Activation of a BWP Pair Set

Figure 6:
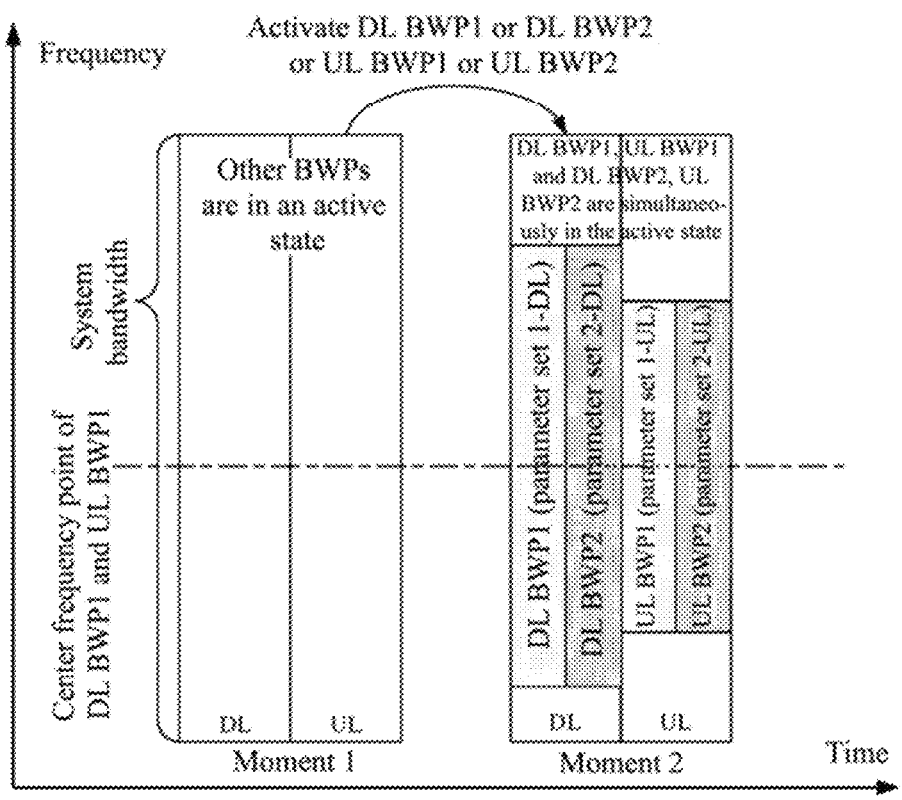
FIG. 6 is a schematic diagram according to an embodiment of the present disclosure in which BWPs in one BWP pair set have the same frequency domain position and bandwidth size.

As shown in Table 4, FIG. 6 is a first predetermined rule-in a BWP pair set, DL BWPs have the same frequency domain position and bandwidth size, and UL BWP have the same frequency domain position and bandwidth size. The first configuration information configures 4 DL BWPs and 4 UL BWPs, where DL BWP1 and DL BWP2 have the same frequency domain position and bandwidth size, and UL BWP1 and UL BWP2 have the same frequency domain position and bandwidth size, forming a BWP pair set; DL BWP3 and DL BWP4 have the same frequency domain position and bandwidth sin, and UL BWP3 and UL BWP4 have the same frequency domain position and bandwidth size, forming another BWP pair set. If an ID of DL BWP1 or DL BWP2 or UL BWP1 or UL BWP2 is included in the first control information, DL BWP1, UL BWP1 and DL BWP2 UL BWP2 simultaneously activated; and if an ID of DL BWP3 or DL BWP4 or UL BWP3 or UL BWP4 is included in the first control information, DL BWP3, UL BWP3 and DL BWP4, UL BWP4 are simultaneously activated.

TABLE 4

DL BWPs or UL BWPs included in a BWP pair set have the same frequency domain position and bandwidth size.

| BWP ID | Frequency domain position | Bandwidth size | Parameter set |
|---|---|---|---|
| DL BWP 1 | Frequency domain position 1 | Bandwidth size 1 | Parameter set 1 |
| DL BWP 2 | Frequency domain position 1 | Bandwidth size 1 | Parameter set 2 |
| DL BWP 3 | Frequency domain position 2 | Bandwidth size 2 | Parameter set 1 |
| DL BWP 4 | Frequency domain position 2 | Bandwidth size 2 | Parameter set 2 |
| UL BWP 1 | Frequency domain position 1 | Bandwidth size 3 | Parameter set 1 |
| UL BWP 2 | Frequency domain position 1 | Bandwidth size 3 | Parameter set 2 |
| UL BWP 3 | Frequency domain position 2 | Bandwidth size 4 | Parameter set 1 |
| UL BWP 4 | Frequency domain position 2 | Bandwidth size 4 | Parameter set 2 |

Figure 7:
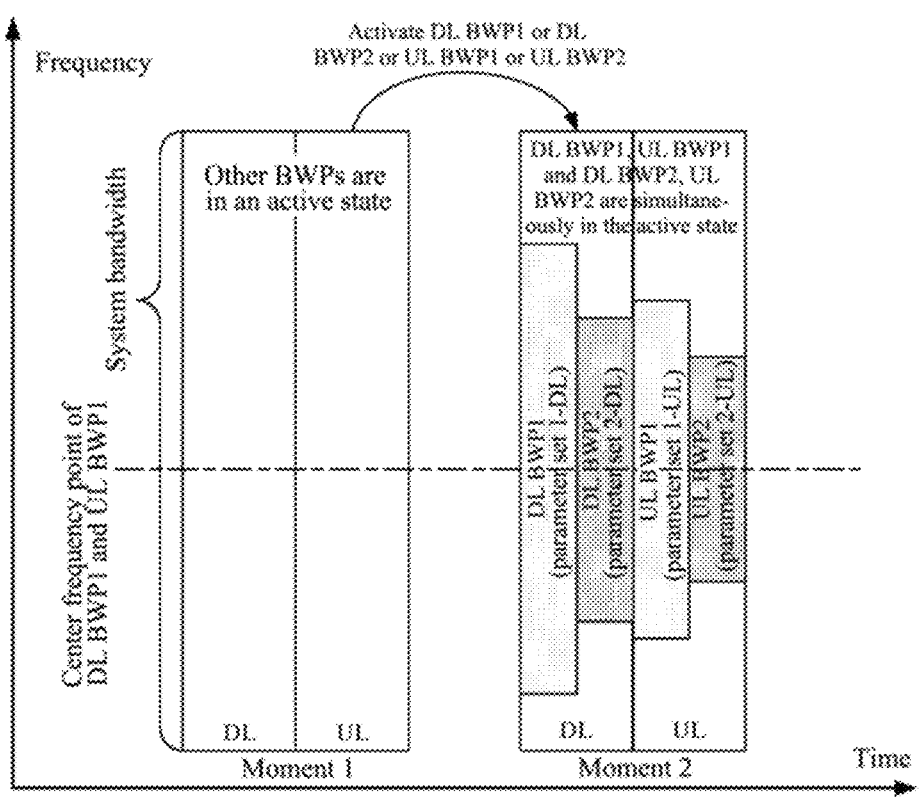
FIG. 7 is a schematic diagram according to an embodiment of the present disclosure in which, in a BWP pair set, frequency domain ranges of DL BWP2, . . . , DL BWPN are within a frequency domain range of DL BWP1 and frequency domain ranges of UL BWP2, . . . , UL BWPN are within a frequency domain range of UL BWP1.

As shown in Table 5, FIG. 7 is a second predetermined rule-frequency domain ranges of BWP2, . . . , BWPN in a BWP set are within a frequency domain range of BWP1. The first configuration information is configured 4 downlink BWPs, where a frequency domain range of DL BWP2 is within a frequency domain range of DL BWP1, and DL BWP1 and DL BWP2 to form a DL BWP set; and a frequency domain range of DL BWP4 is within a frequency domain range of DL BWP3, and DL BWP3 and DL BWP4 form another DL BWP set. If an ID of DL BWP1 or DL BWP2 is included in the first control information, DL BWP1 and DL BWP2 are simultaneously activated; and if an ID of DL BWP3 or DL BWP4 is included in the first control information, DL BWP3 and DL BWP4 are simultaneously activated.

TABLE 5

In a BWP pair set, frequency domain ranges of DL BWP2, . . . , DL BWPN are within a frequency domain range of DL BWP1, and frequency domain ranges of UL BWP2, . . . , UL BWPN are within the frequency domain range of UL BWP1.

| BWP ID | Frequency domain position and bandwidth size | Parameter set |
|---|---|---|
| DL BWP 1 | Frequency domain position 1 and bandwidth size 1 | Parameter set 1 |
| DL BWP 2 | Frequency domain position 2 and bandwidth size 2 (The frequency domain range is within the range of DL BWP1) | Parameter set 2 |
| DL BWP 3 | Frequency domain position 3 and bandwidth size 3 | Parameter set 1 |
| DL BWP 4 | Frequency domain position 4 and bandwidth size 4 (The frequency domain range is within therange of DL BWP3) | Parameter set 2 |
| UL BWP 1 | Frequency domain position 1 and bandwidth size 5 | Parameter set 1 |
| UL BWP 2 | Frequency domain position 2 and bandwidth size 6 (The frequency domain range is within the range of UL BWP1) | Parameter set 2 |
| UL BWP 3 | Frequency domain position 3 and bandwidth size 7 | Parameter set 1 |
| UL BWP 4 | Frequency domain position 4 and bandwidth size 8 (The frequency domain range is within the range of UL BWP3) | Parameter set 2 |

EXAMPLE 5

BWPs in BWP Pair Set are Simultaneously Deactivated

Figure 8:
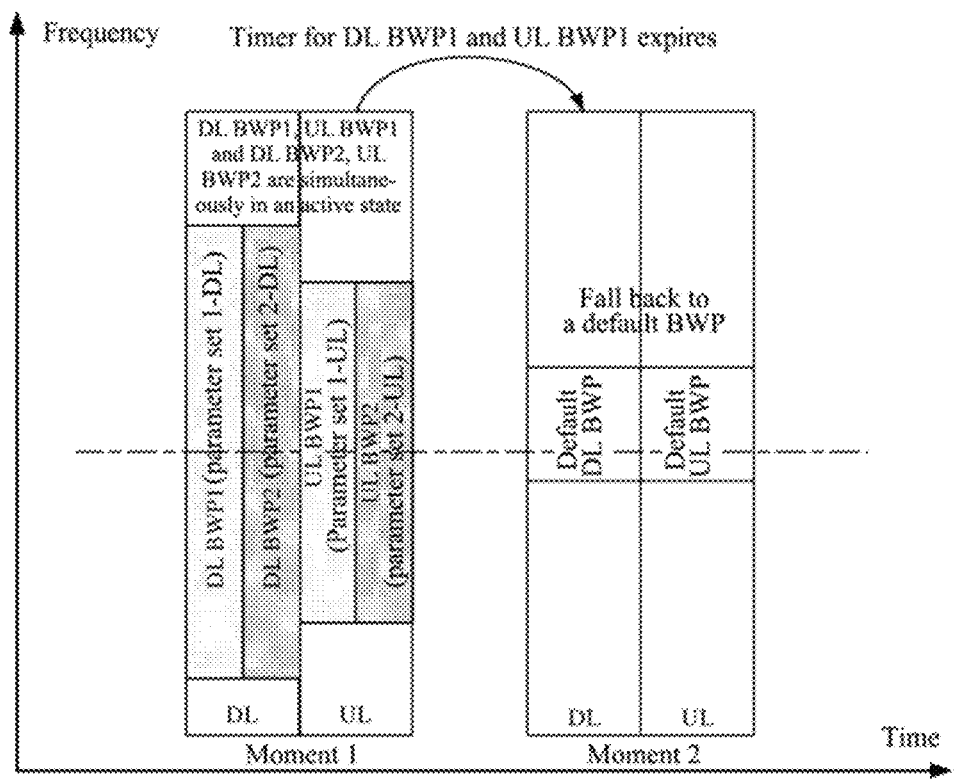
FIG. 8 is a schematic diagram according to an embodiment of the present disclosure in which BWP pairs having the same frequency domain position and bandwidth size are simultaneously deactivated.
Figure 9:
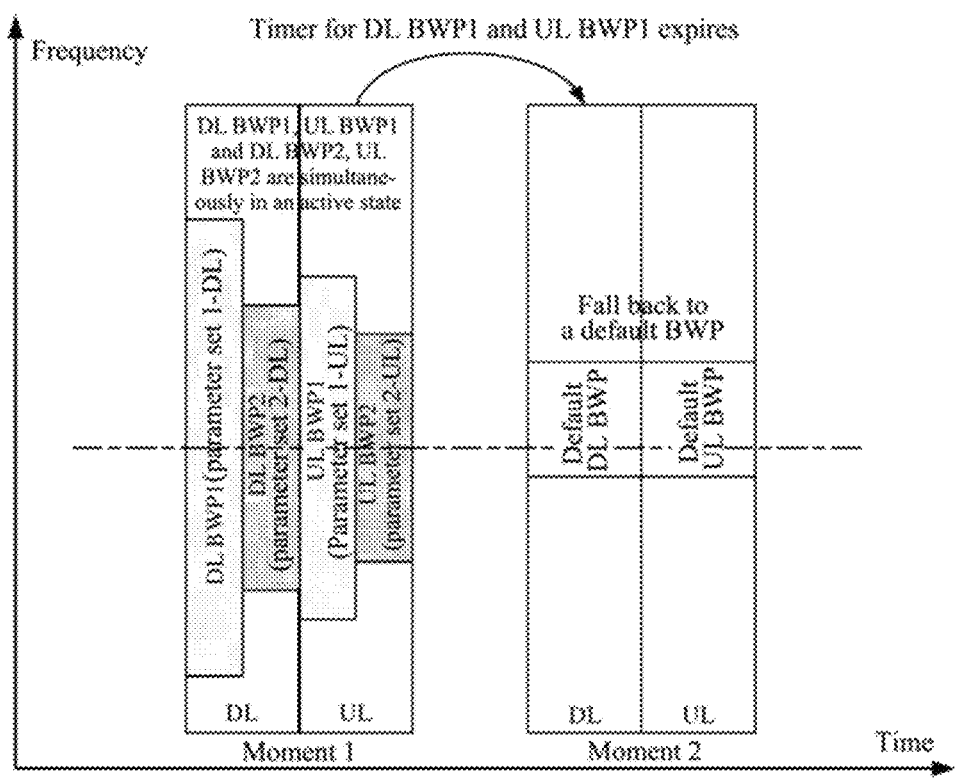
FIG. 9 is a schematic diagram according to an embodiment of the present disclosure in which DL BWP1 and UL BWP1 as well as DL BWP2 and UL BWP2 within a frequency domain range of DL BWP1 and UL BWP1 are simultaneously deactivated after a timer1 for DL BWP1 and UL BWP1 expires.

As shown in FIGS. 8 and 9, when DL BWP1, UL BWP1 and DL BWP2, UL BWP2 are simultaneously in an active state, and DL BWP1 and DL BWP2 have the same frequency domain position and bandwidth size, and UL BWP1 and UL BWP2 have the same frequency domain position and bandwidth size, or a frequency domain range of DL BWP2 is within a frequency domain range of DL BWP1 and a frequency domain range of UL BWP2 is within a frequency domain range of UL BWP1, then when timed for DL BWP1 and UL BWP1 expires, DL BWP1, UL BWP1 and DL BWP2 and UL BWP2 are simultaneously deactivated.

EXAMPLE 6

BWPs in a BWP Pair Set are Separately Deactivated

Figure 10:
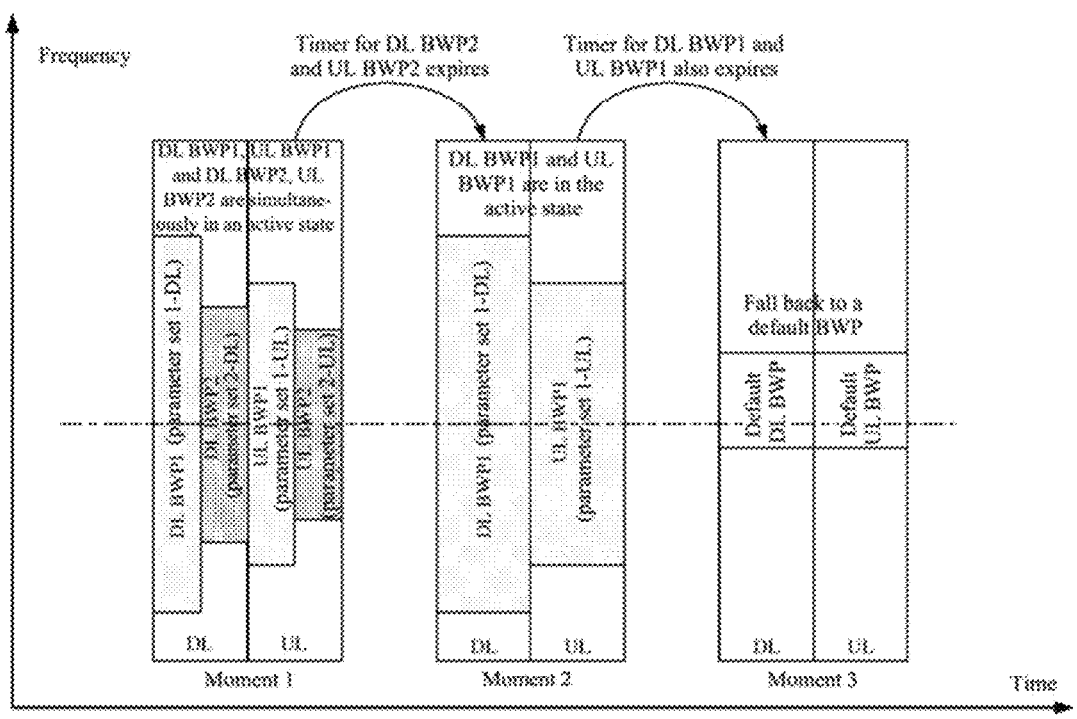
FIG. 10 is a schematic diagram according to an embodiment of the present disclosure in which DL BWP2 and UL BWP2 are deactivated before DL BWP1 and UL BWP1.
Figure 11:
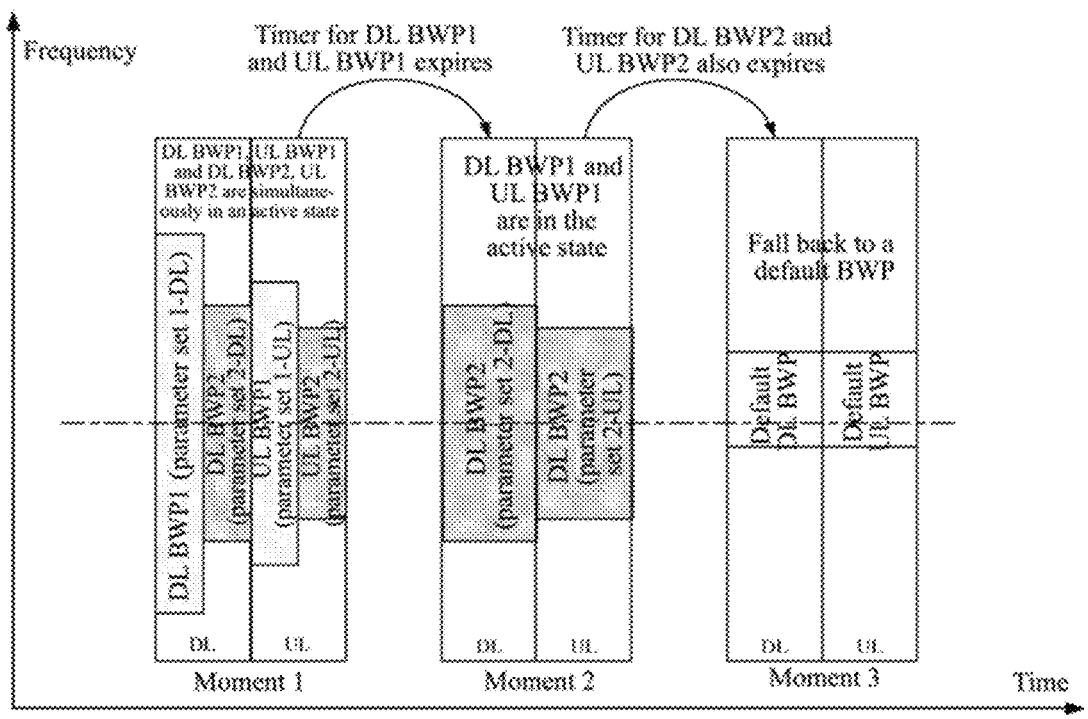
FIG. 11 is a schematic diagram according to an embodiment of the present disclosure in which DL BWP1 and UL BWP1 are deactivated before DL BWP2 and UL BWP2.

As shown in FIGS. 10 and 11, when DL BWP1, UL BWP1 and DL BWP2, UL BWP2 are simultaneously in an active state; then when the timer1 for DL BWP1 and UL BWP1 expires, DL BWP1 and UL BWP1 are deactivated, and DL BWP2 and UL BWP2 are still in the active state; and when the timer2 for DL BWP2 and UL BWP2 expires, DL BWP2 and UL BWP2 are deactivated, and DL BWP1 and UL BWP1 are still in the active state.

Figure 12:
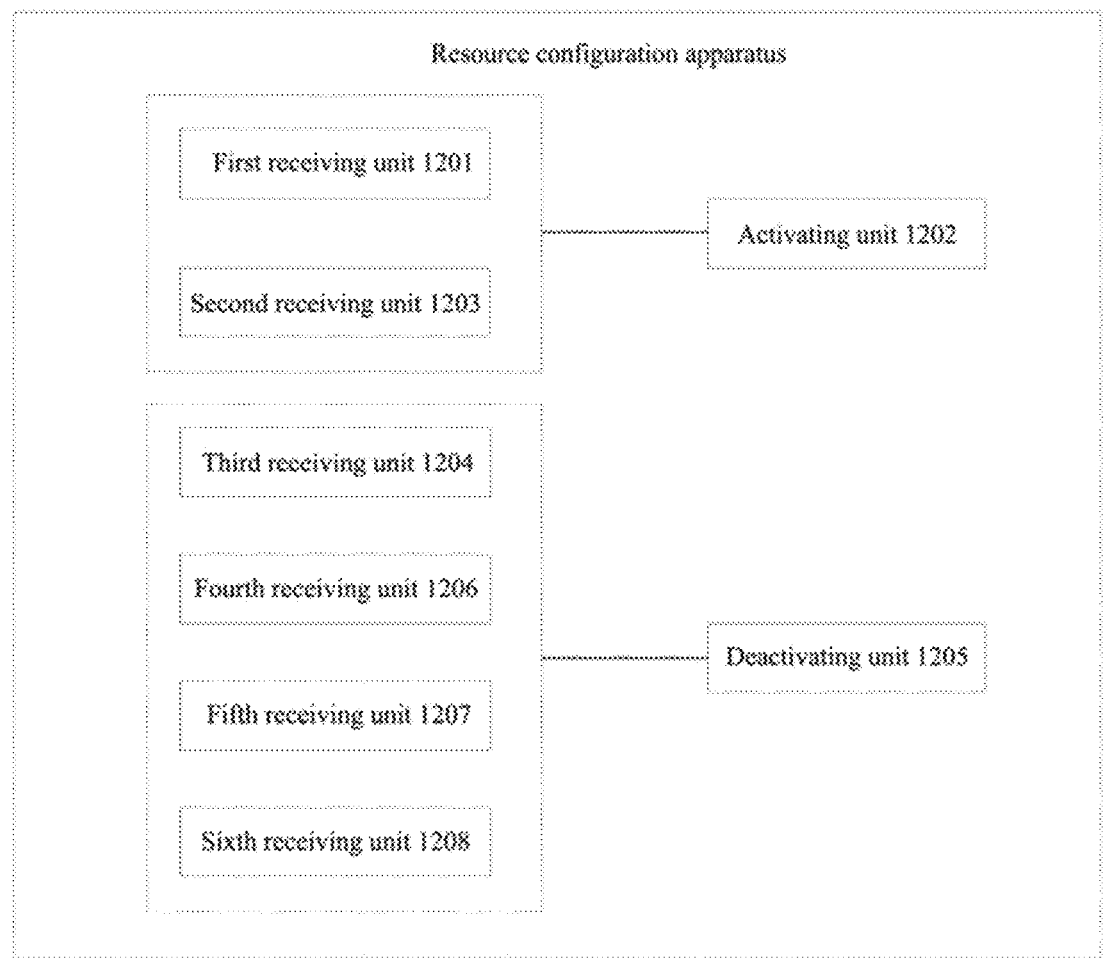
FIG. 12 is a first schematic diagram of a structural composition of a resource configuration apparatus according to an embodiment of the present disclosure.

FIG. 12 is a first schematic diagram of a structural composition of a resource configuration apparatus according to an embodiment of the present disclosure. As shown in FIG. 12, the resource configuration apparatus includes:

a first receiving unit 1201, configured to receive first control information sent by a network device, where the first control information includes first indication information, where the first indication information is used to determine at least two downlink bandwidth parts BWPs and at feast two uplink BWPs to be activated; and an activating unit 1202, configured to activate the at least two downlink BWPs and the at least two uplink BWPs according to the first control information.

In an implementation, the apparatus further includes:
a second receiving unit 1203, configured to receive first configuration information sent by the network device, where the first configuration information includes configuration information of at least one downlink BWP set and at least one uplink BWP set, where each of the at least one downlink BWP set includes multiple downlink BWPs, and each of the at least one uplink BWP set includes multiple uplink BWPs.

In an implementation, the activating: unit 1202 is configured to activate downlink BWPs in a first downlink BWP set and uplink BWPs in a first uplink BWP set if the first indication information is indication information of the first downlink BWP set or the first uplink BWP set.

In an implementation, the apparatus further includes:
an third receiving unit 1204, configured to receive second configuration information sent by the network device, where the second configuration information includes first duration information corresponding to the first downlink BWP set and/or the first uplink BWP set; and a deactivating unit 1205, configured to deactivate the downlink BWPs in the first downlink BWP set and the uplink BWPs in the first uplink BWP set when an activation duration of the downlink BWPs in the first downlink BWP set and the uplink BWPs in the first uplink BWP set reaches a first duration indicated by the first duration information.

In an implementation, the apparatus further includes:
a fourth receiving unit 1206, configured to receive third configuration information sent by the network device, where the third configuration information includes second duration information corresponding to a first downlink BWP in the first downlink BWP set and a first uplink BWP in the first uplink BWP set; and a deactivating unit 1205, configured to deactivate the first downlink BWP and the first uplink BWP when an activation duration of the first downlink BWP and the first uplink BWP reaches a second duration indicated by the second duration information.

In an implementation, the activating, unit 1202 is further configured to activate a default BWP when the downlink BWPs in the first downlink BWP set and the uplink BWPs in the first uplink BWP set are both deactivated.

In an implementation, the activating unit 1202 is configured to activate downlink BWPs in a second downlink BWP set and uplink BWPs in a second uplink BWP set if it is determined that the downlink BWPs in the second downlink BWP set and the uplink BWPs in the second uplink BWP set meet a predetermined rule based on the first configuration information and the first indication information is indication information of a second downlink BWP in the second downlink BWP set or indication information of a second uplink BWP in the second uplink BWP set.

In an implementation, the activating unit 1202 is configured to activate a second downlink BWP in a second downlink BWP set and a second uplink BWP in a second uplink BWP set if it is determined that downlink BWPs in the second downlink BWP set or uplink BWPs in the second uplink BWP set does not meet a predetermined rule based on the first configuration information and the first indication information is indication information of the second downlink BWP in the second downlink BWP set or indication information of the second uplink BWP in the second uplink BWP set.

In an implementation, the downlink BWPs in the second downlink BWP set and the uplink BWPs in the second uplink BWP set meeting a predetermined rule, includes:
the downlink BWPs in the second downlink BWP set having the same frequency domain position and bandwidth size, and the uplink BWPs in the second uplink BWP set having the same frequency domain position and bandwidth sizes; or, frequency domain ranges of downlink BWPs other than the second downlink BWP in the second downlink BWP set being within a frequency domain range of the second downlink BWP, and frequency domain ranges of uplink BWPs other than the second uplink BWP in the second uplink BWP set being within a frequency domain range of the second uplink BWP; or, a radio frequency bandwidth capability of the terminal, being capable of simultaneously covering frequency domain ranges of the downlink BWPs in the second downlink BWP set and frequency domain ranges of the uplink BWPs in the second uplink BWP set.

In an implementation, the apparatus further includes:
a fifth receiving unit 1207, configured to receive fourth configuration information sent by the network device, where the fourth configuration information includes third duration information corresponding to the second downlink BWP and the second uplink BWP; and a deactivating unit 1205, configured to deactivate the downlink BWPs in the second downlink BWP set and the uplink BWPs in the second uplink BWP set when an activation duration of the second downlink BWP and the second uplink BWP reaches a third duration indicated by the third duration information.

In an implementation, the apparatus huffier includes:

a sixth receiving unit 1208, configured to receive fifth configuration information sent by the network device, where the fifth configuration information includes fourth duration information corresponding to a third downlink BWP in the second downlink BWP set and a third uplink BWP in the second uplink BWP set; and a deactivating unit 1205, configured to deactivate the third downlink BWP and the third uplink BWP when an activation duration of the third downlink BWP and the third uplink BWP reaches a fourth duration indicated by the fourth duration information, where the third downlink BWP is different from the second downlink BWP, and the third uplink BWP is different from the second uplink BWP.

In an implementation, the activating unit 1202 is further configured to activate a default BWP when the downlink BWPs in the second downlink BWP set and the uplink BWP in the second uplink BWP set are both deactivated.

Those skilled in the art should understand that an implementation function of the units in the resource configuration apparatus shown in FIG. 12 can be understood by referring to the related description of the foregoing resource configuration method. The function of the units in the resource configuration apparatus shown in FIG. 12 can be realized by a program running on a processor, or may be realized by a specific logic circuit.

Figure 13:
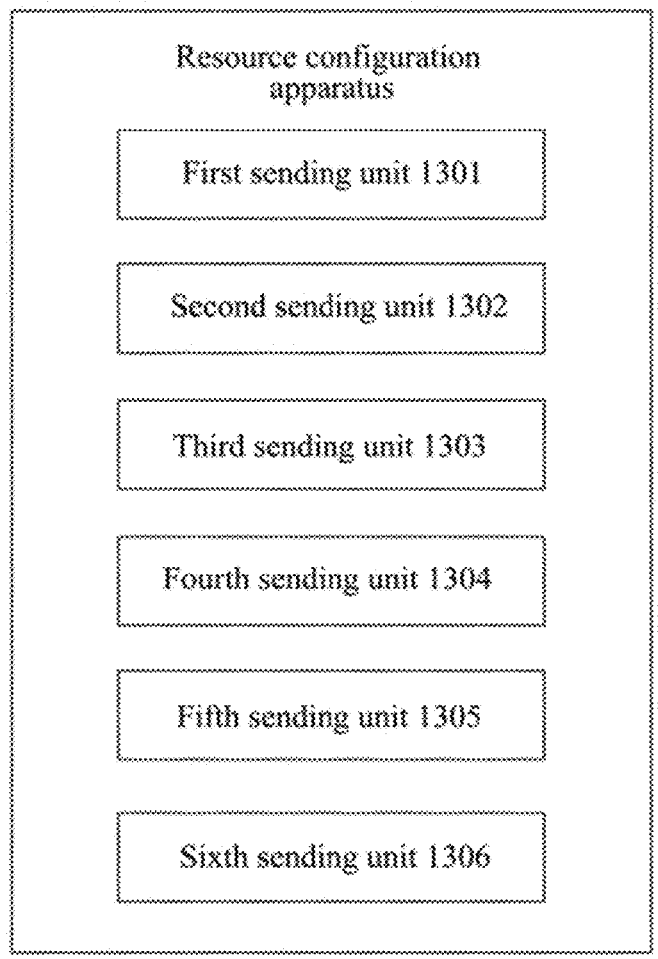
FIG. 13 is a second schematic diagram of a structural composition of a resource configuration apparatus according to an embodiment of the present disclosure.

FIG. 13 is a second schematic diagram of a structural composition of a resource configuration apparatus according to an embodiment of the present disclosure. As shown in FIG. 13, the resource configuration apparatus includes:

a first sending unit 1301, configured to send first control information to a terminal, where the first control information includes first indication information, where the first indication information is used to determine at least two downlink BWPs and at least two uplink BWPs to be activated to cause the terminal to activate the at least two downlink BWPs and the at least two uplink BWPs according to the first control information.

In an implementation, the apparatus further includes:

a second sending unit 1302, configured to send first control information to the terminal, where the first configuration information includes configuration information of at least one downlink BWP set and at least one uplink BWP set, where each of the at least one downlink BWP set includes multiple downlink BWPs, and each of the at least one uplink BWP set includes multiple uplink BWPs.

In an implementation, the first indication information is used to cause the terminal to activate downlink BWPs in a first downlink BWP set and uplink BWPs in a first uplink BWP set if the first indication information is indication information of the first downlink BWP set or the first uplink BWP set.

In an implementation, the apparatus further includes:

a third sending unit 1303, configured to send second configuration information to the terminal, where the second configuration information includes first duration information corresponding to the first downlink BWP set and/or the first uplink BWP set;

where the first duration information is used to cause the terminal to deactivate the downlink BWPs in the first downlink BWP set and the uplink BWPs in the first uplink BWP set when an activation duration of the downlink BWPs in the first downlink BWP set and the uplink BWPs in the first uplink BWP set reaches a first duration indicated by the first duration information.

In an implementation, the apparatus further includes:

a fourth sending unit 1304, configured to send third configuration information to the terminal, where the third configuration information includes second duration information corresponding to a first downlink BWP in the first downlink BWP set and a first uplink BWP in the first uplink BWP set;

where the second duration information is used to cause the terminal to deactivate the first downlink BWP and the first uplink BWP when an activation duration of the first downlink BWP and the first uplink BWP roaches a second duration indicated by the second duration information.

In an implementation, the first indication information is used to cause the terminal to activate downlink BWPs in a second downlink BAT set and uplink BWPs in a second uplink BWP set if it is determined that the downlink BWPs in the second downlink BWP set and the uplink BWPs in the second uplink BWP set meet a predetermined rule based on the first configuration information and the first indication information is indication information of a second downlink BWP in the second downlink BWP set or indication information of a second uplink BUT in the second uplink BWP set.

In an implementation, the first indication information is used to cause the terminal to activate a second downlink BWP in a second downlink BWP set and a second uplink BWP in a second uplink BWP set if it is determined that downlink BWPs in the second downlink BWP set or uplink BWPs in the second uplink BWP set does not meet a predetermined rule based on the first configuration information and the first indication information is indication information of the second downlink BWP in the second downlink BWP set or indication information of the second uplink BWP in the second uplink BWP set.

In an implementation, the downlink BWPs in the second downlink BWP set and the uplink BWPs in the second uplink BWP set meeting a predetermined rule, includes:

the downlink BWPs in the second downlink BWP set having the same frequency domain position and bandwidth size, and the uplink BWPs in the second uplink BWP set having the same frequency domain position and bandwidth sizes; or, frequency domain ranges of downlink BWPs other than the second downlink BWP in the second downlink BWP set being within a frequency domain range of the second downlink BWP, and frequency domain ranges of uplink BWPs other than the second uplink BWP in the second uplink BWP set being within a frequency domain range of the second uplink BWP; or, a radio frequency bandwidth capability of the terminal, being capable of simultaneously covering frequency domain ranges of the downlink BWPs in the second downlink BWP set and frequency domain ranges of the uplink BWPs in the second uplink BWP set.

In an implementation, the apparatus further includes:

a filth sending unit 1305, configured to send fourth configuration information to the terminal, where the fourth configuration information includes third duration information corresponding to the second downlink BWP and the second uplink BWP;

where the third duration information is used to cause the terminal to deactivate the downlink BWPs in the second downlink BWP set and the uplink BWPs in the second uplink BWP set when an activation duration of the second downlink BWP and the second uplink BWP reaches a third duration indicated by the third duration information.

In an implementation, the apparatus further includes:

a sixth sending unit 1306, configured to send fifth configuration information to the terminal, where the fifth configuration information includes fourth duration information corresponding to a third downlink BWP in the second downlink BWP set and a third uplink BWP in the second uplink BWP set;

where the fourth duration information is used to cause the terminal to deactivate the third downlink BWP and the third uplink BWP when an activation duration of the third downlink BWP and the third uplink BWP reaches a fourth duration indicated by the fourth duration information, where the third downlink BWP is different from the second downlink BWP, and the third uplink BWP is different from the second uplink BWP.

Those skilled in the art should understand that an implementation function of the units in the resource configuration apparatus shown in FIG. 13 can be understood by referring to the related description of the foregoing resource configuration method. The function of the units in the resource configuration apparatus shown in FIG. 13 can be realized by a program running on a processor, or may be realized by a specific logic circuit.

If the above resource configuration apparatus in the embodiments of the present disclosure is implemented in the form of a software function module and sold or used as an independent product, it may also be stored in a computer-readable storage medium. Based on this understanding, the technical solutions of the embodiments of the present disclosure in essence or part thereof contributing to the existing technology may be embodied in the form of software products. The computer software product is stored in a storage medium and includes several instructions that enable a computer device (which may be a personal computer, server, or network device, etc.) to perform all or part of the methods described in various embodiments of the present disclosure. The foregoing storage medium includes various media that can store program codes, such as a U disk, a mobile hard disk, a read-only memory (ROM), a magnetic disk, or an optical disk. In this way, the embodiments of the present disclosure are not limited to any specific combination of hardware and software.

Correspondingly, an embodiment of the present disclosure also provides a computer storage medium having computer-executable instructions stored thereon where the computer-executable hist actions, when executed by a processor, implement the above resource configuration methods of the embodiments of the present disclosure.

Figure 14:
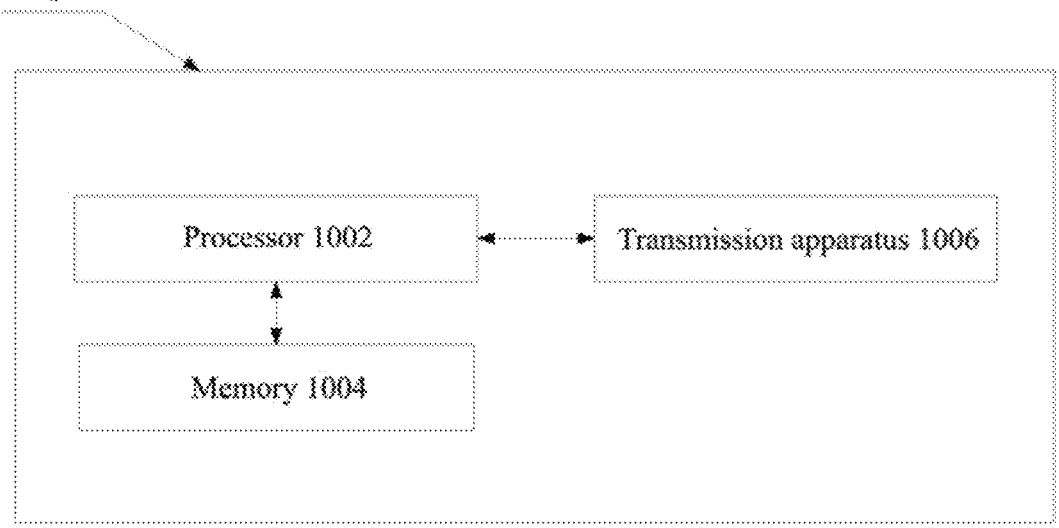
FIG. 14 is a schematic structural diagram of a computer device according to an embodiment of the present disclosure.

FIG. 14 is a schematic structural diagram of a computer device according to an embodiment of the present disclosure, and the computer device may be a terminal or a network device. As shown in FIG. 14, the computer device 100 may include one or more (only one is shown in the figure) processors 1002 (the processors 1002 may include but not limited to a processing apparatus such as a micro controller unit (MCU) or a field programmable gate array (FPGA)), a memory 1004 for storing data, and a transmission apparatus 1006 for a communication function. Those skilled in the art may understand that the structure shown in FIG. 14 is merely an illustration, and does not limit the structure of the above electronic apparatus. For example, the computer device 100 may further include more or fewer components than those shown in FIG. 14 or have a different configuration from that shown in FIG. 14.

The memory 1004 may be used to store software programs of an application software and modules, such as program instructions/modules corresponding to the methods in the embodiments of the present disclosure. The processors 1002 execute various functional applications and data processing, that is achieve the above method, by running the software programs and modules stored in the memory 1004. The memory 1004 may include a high-speed random access memory, and may also include a non-volatile memory, such as one or more magnetic storage apparatuses, flash memories, or other non-volatile solid-state memories. In some examples, the memory 1004 may further include a memory remotely provided with respect to the processors 1002, and the remote memory may be connected to the computer device 100 through a network. An example of the above network includes but is not limited to an Internet, an intranet, a local area network, a mobile communication network, and a combination thereof.

The transmission apparatus 1006 is used to receive or transmit data via a network. A specific example of the network described above may include a wireless network provided by a communication provider of the computer device 100. In an example, the transmission apparatus 1006 includes a network interface controller (NIC), which can be connected to other network devices through a base station to communicate with the Internet. In an example, the transmission apparatus 1006 may be a radio frequency (RF) module, which is used to communicate with the Internet in wireless way.

The technical solutions described in the embodiments of the present disclosure can be arbitrarily combined without conflict.

In the several embodiments provided by the present disclosure, it should be understood that the disclosed method and smart device may be implemented in other ways. The device embodiments described above are only schematic. For example, a division of the units is only a division of logical functions. In actual implementation, there may be another division way. For example, multiple units or components may be combined or can be integrated into another system or some features can be ignored, or not implemented. In addition, the coupling or direct coupling or communication connection between the displayed or discussed components may be through some interfaces, and an indirect coupling or communication connection of the devices or units may be electrical, mechanical, or in other ways.

The writs described as separate components may or may not be physically separated, and the components displayed as units may or may not be physical units, that is, they may be located in one place or distributed in multiple network units; some or all of the units therein may be selected according to actual needs to achieve the purpose of the solutions of the embodiment.

In addition, functional units in the embodiments of the present disclosure may all be integrated into one secondary processing unit, or each unit may be separately used as a unit, two or more units may be integrated into one unit; the above integrated unit can be implemented in the form of hardware, or in the form of hardware pins software functional unit.

The above are only specific embodiments of the present disclosure, but the protection scope of the present disclosure is not limited to this. Any skilled in the art can easily think of changes or replacements within the technical scope disclosed by the present disclosure which should be covered by the protection scope of the present disclosure.

What is claimed is:

1. A resource configuration method, comprising:
receiving, by a terminal, first control information sent by a network device, wherein the first control information comprises first indication information, wherein the first indication information is used to determine at least two downlink bandwidth parts (BWPs) and at least two uplink BWPs to be activated;
activating, by the terminal, the at least two downlink BWPs and the at least two uplink BWPs according to the first control information;
receiving, by the terminal, first configuration information sent by the network device, wherein the first configuration information comprises configuration information of at least one downlink BWP set and at least one uplink BWP set, wherein each of the at least one downlink BWP set comprises multiple downlink BWPs, and each of the at least one uplink BWP set comprises multiple uplink BWPs; and
activating, by the terminal, a second downlink BWP in a second downlink BWP set and a second uplink BWP in a second uplink BWP set if it is determined that downlink BWPs in the second downlink BWP set or uplink BWPs in the second uplink BWP set does not meet a predetermined rule based on the first configuration information and the first indication information is indication information of the second downlink BWP in the second downlink BWP set or indication information of the second uplink BWP in the second uplink BWP set.

2. The method of claim 1, wherein the activating, by the terminal, the at least two downlink BWPs and the at least two uplink BWPs according to the first control information comprises:
activating, by the terminal, downlink BWPs in a first downlink BWP set and uplink BWPs in a first uplink BWP set if the first indication information is indication information of the first downlink BWP set or the first uplink BWP set.

3. The method of claim 2, further comprising:
receiving, by the terminal, second configuration information sent by the network device, wherein the second configuration information comprises first duration information corresponding to at least one of the first downlink BWP set and the first uplink BWP set; and deactivating the downlink BWPs in the first downlink BWP set and the uplink BWPs in the first uplink BWP set when an activation duration of the downlink BWPs in the first downlink BWP set and the uplink BWPs in the first uplink BWP set reaches a first duration indicated by the first duration information; or
receiving, by the terminal, third configuration information sent by the network device, wherein the third configuration information comprises second duration information corresponding to a first downlink BWP in the first downlink BWP set and a first uplink BWP in the first uplink BWP set; and deactivating the first downlink BWP and the first uplink BWP when an activation duration of the first downlink BWP and the first uplink BWP reaches a second duration indicated by the second duration information;
wherein the method further comprises:
activating a default BWP when the downlink BWPs in the first downlink BWP set and the uplink BWPs in the first uplink BWP set are both deactivated.

4. The method of claim 1, wherein the activating, by the terminal, the at least two downlink BWPs and the at least two uplink BWPs according to the first control information comprises:
activating, by the terminal, downlink BWPs in the second downlink BWP set and uplink BWPs in the second uplink BWP set if it is determined that the downlink BWPs in the second downlink BWP set and the uplink BWPs in the second uplink BWP set meet the predetermined rule based on the first configuration information and the first indication information is indication information of the second downlink BWP in the second downlink BWP set or indication information of the second uplink BWP in the second uplink BWP set.

5. The method of claim 4, further comprising:
receiving, by the terminal, fourth configuration information sent by the network device, wherein the fourth configuration information comprises third duration information corresponding to the second downlink BWP and the second uplink BWP;
deactivating the downlink BWPs in the second downlink BWP set and the uplink BWPs in the second uplink BWP set when an activation duration of the second downlink BWP and the second uplink BWP reaches a third duration indicated by the third duration information;
receiving, by the terminal, fifth configuration information sent by the network device, wherein the fifth configuration information comprises fourth duration information corresponding to a third downlink BWP in the second downlink BWP set and a third uplink BWP in the second uplink BWP set; and
deactivating the third downlink BWP and the third uplink BWP when an activation duration of the third downlink BWP and the third uplink BWP reaches a fourth duration indicated by the fourth duration information, wherein the third downlink BWP is different from the second downlink BWP, and the third uplink BWP is different from the second uplink BWP.

6. A resource configuration apparatus, comprising:
a memory, a processor, a transceiver, and a computer program stored on the memory and operable on the processor,
wherein the processor, when running the computer program, is configured to:
control the transceiver to receive first control information sent by a network device, wherein the first control information comprises first indication information, wherein the first indication information is used to determine at least two downlink bandwidth parts (BWPs) and at least two uplink BWPs to be activated;
activate the at least two downlink BWPs and the at least two uplink BWPs according to the first control information;
control the transceiver to receive first configuration information sent by the network device, wherein the first configuration information comprises configuration information of at least one downlink BWP set and at least one uplink BWP set, wherein each of the at least one downlink BWP set comprises multiple downlink BWPs, and each of the at least one uplink BWP set comprises multiple uplink BWPs; and
activate a second downlink BWP in a second downlink BWP set and a second uplink BWP in a second uplink BWP set if it is determined that downlink BWPs in the second downlink BWP set or uplink BWPs in the second uplink BWP set does not meet a predetermined rule based on the first configuration information and the first indication information is indication information of the second downlink BWP in the second downlink BWP set or indication information of the second uplink BWP in the second uplink BWP set.

7. The apparatus of claim 6, wherein the processor is configured to activate downlink BWPs in a first downlink BWP set and uplink BWPs in a first uplink BWP set if the first indication information is indication information of the first downlink BWP set or the first uplink BWP set.

8. The apparatus of claim 7, wherein the processor is further configured to:
control the transceiver to receive second configuration information sent by the network device, wherein the second configuration information comprises first duration information corresponding to at least one of the first downlink BWP set and the first uplink BWP set; and deactivate the downlink BWPs in the first downlink BWP set and the uplink BWPs in the first uplink BWP set when an activation duration of the downlink BWPs in the first downlink BWP set and the uplink BWPs in the first uplink BWP set reaches a first duration indicated by the first duration information; or
control the transceiver to receive third configuration information sent by the network device, wherein the third configuration information comprises second duration information corresponding to a first downlink BWP in the first downlink BWP set and a first uplink BWP in the first uplink BWP set; and deactivate the first downlink BWP and the first uplink BWP when an activation duration of the first downlink BWP and the first uplink BWP reaches a second duration indicated by the second duration information;
wherein the processor is further configured to activate a default BWP when the downlink BWPs in the first downlink BWP set and the uplink BWPs in the first uplink BWP set are both deactivated.

9. The apparatus of claim 6, wherein the processor is configured to activate downlink BWPs in the second downlink BWP set and uplink BWPs in the second uplink BWP set if it is determined that the downlink BWPs in the second downlink BWP set and the uplink BWPs in the second uplink BWP set meet the predetermined rule based on the first configuration information and the first indication information is indication information of the second downlink BWP in the second downlink BWP set or indication information of the second uplink BWP in the second uplink BWP set.

10. The apparatus of claim 9, wherein the processor is further configured to:
control the transceiver to receive fourth configuration information sent by the network device, wherein the fourth configuration information comprises third duration information corresponding to the second downlink BWP and the second uplink BWP;
deactivate the downlink BWPs in the second downlink BWP set and the uplink BWPs in the second uplink BWP set when an activation duration of the second downlink BWP and the second uplink BWP reaches a third duration indicated by the third duration information;
control the transceiver to receive fifth configuration information sent by the network device, wherein the fifth configuration information comprises fourth duration information corresponding to a third downlink BWP in the second downlink BWP set and a third uplink BWP in the second uplink BWP set; and deactivate the third downlink BWP and the third uplink BWP when an activation duration of the third downlink BWP and the third uplink BWP reaches a fourth duration indicated by the fourth duration information, wherein the third downlink BWP is different from the second downlink BWP, and the third uplink BWP is different from the second uplink BWP.

11. A resource configuration apparatus, comprising:
a memory, a processor, a transceiver, and a computer program stored on the memory and operable on the processor,
wherein the processor, when running the computer program, is configured to:
control the transceiver to send first control information to a terminal, wherein the first control information comprises first indication information, wherein the first indication information is used to determine at least two downlink bandwidth parts (BWPs) and at least two uplink BWPs to be activated to cause the terminal to activate the at least two downlink BWPs and the at least two uplink BWPs according to the first control information; and
control the transceiver to send first configuration information to the terminal, wherein the first configuration information comprises configuration information of at least one downlink BWP set and at least one uplink BWP set, wherein each of the at least one downlink BWP set comprises multiple downlink BWPs, and each of the at least one uplink BWP set comprises multiple uplink BWPs;
wherein the first indication information is used to cause the terminal to activate a second downlink BWP in a second downlink BWP set and a second uplink BWP in a second uplink BWP set if it is determined that downlink BWPs in the second downlink BWP set or uplink BWPs in the second uplink BWP set does not meet a predetermined rule based on the first configuration information and the first indication information is indication information of the second downlink BWP in the second downlink BWP set or indication information of the second uplink BWP in the second uplink BWP set.

12. The apparatus of claim 11, wherein the first indication information is used to cause the terminal to activate downlink BWPs in a first downlink BWP set and uplink BWPs in a first uplink BWP set if the first indication information is indication information of the first downlink BWP set or the first uplink BWP set;
wherein the processor is further configured to:
control the transceiver to send second configuration information to the terminal, wherein the second configuration information comprises first duration information corresponding to at least one of the first downlink BWP set and the first uplink BWP set; wherein the first duration information is used to cause the terminal to deactivate the downlink BWPs in the first downlink BWP set and the uplink BWPs in the first uplink BWP set when an activation duration of the downlink BWPs in the first downlink BWP set and the uplink BWPs in the first uplink BWP set reaches a first duration indicated by the first duration information; or
control the transceiver to send third configuration information to the terminal, wherein the third configuration information comprises second duration information corresponding to a first downlink BWP in the first downlink BWP set and a first uplink BWP in the first uplink BWP set; wherein the second duration information is used to cause the terminal to deactivate the first downlink BWP and the first uplink BWP when an activation duration of the first downlink BWP and the first uplink BWP reaches a second duration indicated by the second duration information.

13. The apparatus of claim 11, wherein the first indication information is used to cause the terminal to activate downlink BWPs in the second downlink BWP set and uplink BWPs in the second uplink BWP set if it is determined that the downlink BWPs in the second downlink BWP set and the uplink BWPs in the second uplink BWP set meet the predetermined rule based on the first configuration information and the first indication information is indication information of the second downlink BWP in the second downlink BWP set or indication information of the second uplink BWP in the second uplink BWP set.

14. The apparatus of claim 13, wherein the processor is further configured to:
control the transceiver to send fourth configuration information to the terminal, wherein the fourth configuration information comprises third duration information corresponding to the second downlink BWP and the second uplink BWP; wherein the third duration information is used to cause the terminal to deactivate the downlink BWPs in the second downlink BWP set and the uplink BWPs in the second uplink BWP set when an activation duration of the second downlink BWP and the second uplink BWP reaches a third duration indicated by the third duration information; and
control the transceiver to send fifth configuration information to the terminal, wherein the fifth configuration information comprises fourth duration information corresponding to a third downlink BWP in the second downlink BWP set and a third uplink BWP in the second uplink BWP set; wherein the fourth duration information is used to cause the terminal to deactivate the third downlink BWP and the third uplink BWP when an activation duration of the third downlink BWP and the third uplink BWP reaches a fourth duration indicated by the fourth duration information, wherein the third downlink BWP is different from the second downlink BWP, and the third uplink BWP is different from the second uplink BWP.

* * * * *